(12) United States Patent
Cohen et al.

(10) Patent No.: US 11,618,091 B2
(45) Date of Patent: Apr. 4, 2023

(54) TOOL HOLDER HAVING SIMULTANEOUS RADIALLY ADJUSTABLE INSERT CARTRIDGES AND ROTARY CUTTING TOOL

(71) Applicant: Iscar, Ltd., Tefen (IL)

(72) Inventors: Nir Cohen, Kibbutz Saar (IL); Mark Ashqar, Fasuta (IL)

(73) Assignee: Iscar, Ltd., Tefen (IL)

( * ) Notice: Subject to any disclaimer, the term of this patent is extended or adjusted under 35 U.S.C. 154(b) by 181 days.

(21) Appl. No.: 16/591,765

(22) Filed: Oct. 3, 2019

(65) Prior Publication Data
US 2021/0101213 A1     Apr. 8, 2021

(51) Int. Cl.
*B23B 29/034* (2006.01)

(52) U.S. Cl.
CPC .... *B23B 29/03403* (2013.01); *B23B 2260/03* (2013.01); *B23B 2260/0725* (2013.01)

(58) Field of Classification Search
CPC ............ B23B 29/034; B23B 29/03403; B23B 29/03421; B23B 29/03428; B23B 29/03432; B23B 29/03457; B23B 29/0346; B23B 29/046; B23B 29/03478; B23B 29/03482; B23B 29/03485; B23B 29/03425; B23B 29/03467; B23B 29/0341; B23B 2260/0725; B23B 2260/02;
(Continued)

(56) References Cited

U.S. PATENT DOCUMENTS

| 85,545 A | * | 1/1869 | Sullivan | ............... | B23D 77/046 408/175 |
| 376,427 A | * | 1/1888 | Cassidy | ............... | B23D 77/046 144/240 |

(Continued)

FOREIGN PATENT DOCUMENTS

| DE | 364851 C | * | 12/1922 |
| DE | 365488 C | * | 12/1922 |

(Continued)

OTHER PUBLICATIONS

Description FR551333A (translation) obatined at https://worldwide.espacenet.com/ (last visited Apr. 6, 2022).*

(Continued)

*Primary Examiner* — Ryan Rufo
(74) *Attorney, Agent, or Firm* — Womble Bond Dickinson (US) LLP

(57) ABSTRACT

A rotary cutting tool includes a tool holder. The tool holder has holder body and an adjustment sleeve circumferentially disposed thereabout. The adjustment sleeve has an at least one sleeve adjustment groove which decreases in distance from a sleeve central axis in a rotational sleeve direction. The tool holder further has a plurality of insert cartridges, each having an insert pocket and at least one cartridge pin. At least one pin is located in a respective sleeve adjustment groove. The tool holder is adjustable between inner and outer adjusted positions by rotating the adjustment sleeve in the rotational sleeve direction. In the outer adjusted position, the insert cartridges are displaced in an outwards adjusted direction so that the insert pockets are radially outwards compared to the inner adjustment position.

36 Claims, 8 Drawing Sheets

(58) Field of Classification Search
CPC .......... B23B 2260/088; B23C 2245/12; B23C 5/2458; B23C 5/2468; B23C 5/2479
See application file for complete search history.

(56) References Cited

U.S. PATENT DOCUMENTS

| | | | | |
|---|---|---|---|---|
| 1,079,630 A * | 11/1913 | Baum | .................. | B23D 77/046 408/175 |
| 1,150,555 A * | 8/1915 | Thau | | |
| 1,777,265 A | 9/1930 | Jacobsen | | |
| 1,870,350 A * | 8/1932 | Van Norman | .... | B23B 29/03403 408/175 |
| 2,258,097 A * | 10/1941 | Menaquale | ....... | B23B 29/03403 408/175 |
| 2,630,027 A * | 3/1953 | Wunderlich | ...... | B23B 29/03492 82/1.2 |
| 4,043,697 A * | 8/1977 | Eckle | ................ | B23B 29/03407 408/182 |
| 4,101,239 A * | 7/1978 | Wohlhaupter | .... | B23B 29/03407 408/233 |
| 4,595,320 A * | 6/1986 | Berner | .............. | B23B 29/03403 407/45 |
| 4,632,609 A | 12/1986 | Johne | | |
| 5,188,490 A * | 2/1993 | Muendlein | ................ | B23C 5/24 D15/139 |
| 8,033,765 B2 * | 10/2011 | Frank | .................. | B23B 29/0341 408/153 |
| 8,091,205 B2 | 1/2012 | Kadosh | | |
| 8,747,034 B2 * | 6/2014 | Stadelmann | ...... | B23B 29/03407 408/189 |

FOREIGN PATENT DOCUMENTS

| | | | |
|---|---|---|---|
| DE | 497528 | C * | 5/1930 |
| DE | 549904 | C * | 5/1932 |
| DE | 7327727 | U | 10/1973 |
| EP | 1629915 | A1 * | 3/2006 |
| FR | 551333 | A * | 4/1923 |
| FR | 1496089 | A * | 9/1967 |
| GB | 328803 | | 5/1930 |
| GB | 2466660 | | 7/2010 |
| SU | 694288 | A1 | 10/1979 |
| WO | WO 2012/101319 | | 8/2012 |

OTHER PUBLICATIONS

International Search Report dated Jan. 19, 2021, issued in PCT counterpart application (No. PCT/IL2020/050971).
Written Opinion dated Jan. 19, 2021, issued in PCT counterpart application (No. PCT/IL2020/050971).

* cited by examiner

TOOL HOLDER HAVING SIMULTANEOUS RADIALLY ADJUSTABLE INSERT CARTRIDGES AND ROTARY CUTTING TOOL

FIELD OF THE INVENTION

The subject matter of the present application relates to rotary cutting tools having a tool holder having a plurality of insert cartridges retained thereon, in general, and to such cutting tools with an arrangement for simultaneously adjusting the radial position of the insert cartridges, in particular.

BACKGROUND OF THE INVENTION

Rotary cutting tools, having a plurality of peripheral insert cartridges with a cutting insert retained in a circumferentially disposed insert pocket formed on the insert cartridge, can be provided with an adjustment mechanism for adjusting the radial position of any of said insert cartridges and thereby the respective cutting insert seated thereon. Examples of such rotary cutting tools are disclosed in, for example, GB 2466660B2, GB 328803A and WO 2012/101319.

It is an object of the subject matter of the present application to provide a rotary cutting tool with an adjustment mechanism for adjusting the radial position of the cutting inserts and thus the cutting diameter.

SUMMARY OF THE INVENTION

In accordance with a first aspect of the subject matter of the present application there is provided a tool holder configured for rotation about a holder central axis defining opposite axially forward and rearward directions, and opposite rotational preceding and succeeding directions with the preceding direction being the cutting direction, the tool holder comprising:

a holder body comprising a forwardly disposed forward body portion, the forward body portion comprising a generally forward facing body forward surface and a body peripheral surface which extends about the holder central axis and bounds the body forward surface, the body forward surface comprising a plurality of body engagement surfaces;

an adjustment sleeve having a sleeve central axis, the adjustment sleeve comprising:

opposite forward and rearward sleeve end surfaces and a sleeve peripheral surface extending therebetween;

a sleeve through hole comprising a sleeve through hole wall surface which extends about the sleeve central axis and connects the forward and rearward sleeve end surfaces; and at least one sleeve adjustment groove recessed in the forward sleeve end surface, any and all of the sleeve adjustment grooves extending with decreasing distance from the sleeve central axis in a rotational sleeve direction defined by one of the preceding and succeeding directions; and a plurality of insert cartridges, each insert cartridge comprising:

an insert pocket;

a rearward facing cartridge rearward surface comprising a cartridge engagement surface which is mutually engaged with a respective body engagement surface so that the insert cartridge is displaceable in opposite inward and outward adjustment directions; and at least one cartridge pin projecting from the cartridge rearward surface, wherein:

the adjustment sleeve is circumferentially disposed about the holder body, with the sleeve through hole wall surface facing the body peripheral surface so that the adjustment sleeve is rotationally displaceable with respect to the forward body portion; and at least one of the cartridge pins is located in a respective one of the sleeve adjustment grooves defining at least one active cartridge pin; and:

the tool holder is adjustable between an inner adjusted position and an outer adjusted position upon rotation of the adjustment sleeve about the holder axis in a rotational sleeve direction; wherein in the inner adjusted position:

the adjustment sleeve is located at a first angular position relative to the holder central axis; and each insert pocket is spaced apart from the holder central axis by a respective first radial pocket distance; and in the outer adjusted position:

the adjustment sleeve is located at a second angular position relative to holder central axis; and each insert pocket is spaced apart from the holder central axis by a respective second radial pocket distance, the second radial pocket distance being greater than the first radial pocket distance.

In accordance with a second aspect of the subject matter of the present application there is provided a rotary cutting tool comprising:

a tool holder of the type described above; and a plurality of cutting inserts, each cutting insert releasably retained in a respective insert pocket.

In accordance with a third aspect of the subject matter of the present application there is provided a tool holder configured for rotation about a holder central axis defining opposite axially forward and rearward directions, and opposite rotational preceding and succeeding directions with the preceding direction being the cutting direction, the tool holder comprising:

a holder body comprising:

a forwardly disposed forward body portion having a generally forward facing body forward surface comprising a plurality of circumferentially spaced apart body engagement surfaces; and a body peripheral surface which extends about the holder central axis and bounds the body forward surface;

an adjustment sleeve having a sleeve central axis and comprising:

opposite forward and rearward sleeve end surfaces and a sleeve peripheral surface extending therebetween;

a sleeve through hole comprising a sleeve through hole wall surface which extends about the sleeve central axis and connects the forward and rearward sleeve end surfaces; and at least one sleeve adjustment groove, recessed in the forward sleeve end surface, and extending spirally inward for more than one turn of 360°; and a plurality of circumferentially spaced apart insert cartridges, each comprising:
- an insert pocket;
- opposite cartridge forward and rearward surfaces, the cartridge rearward surface comprising a cartridge engagement surface and at least one rearward projecting cartridge pin; and
- a cartridge peripheral surface which extends between the cartridge forward and rearward surfaces; wherein:
  - the adjustment sleeve is circumferentially disposed about the holder body, with the sleeve through hole wall surface facing the body peripheral surface, the adjustment sleeve being rotationally displaceable with respect to the forward body portion;
  - each insert cartridge is engaged to a respective one of the body engagement surfaces and is configured to be slidingly displaced in opposite inward and outward adjustment directions, upon rotation of the adjustment sleeve in opposite rotational directions, relative to the forward body portion; and
  - at least one cartridge pin of each insert cartridge is located in the sleeve adjustment groove defining at least one active cartridge pin; and
  - the tool holder is adjustable between an inner adjusted position and an outer adjusted position; wherein
    - in the inner adjusted position:
      - each insert pocket is spaced apart from the holder central axis by a respective first radial pocket distance; and
    - in the outer adjusted position:

each insert pocket is spaced apart from the holder central axis by a respective second radial pocket distance, the second radial pocket distance being greater than the first radial pocket distance.

It is understood that the above-said is a summary, and that features described hereinafter may be applicable in any combination to the subject matter of the present application, for example, any of the following features may be applicable to the tool holder or rotary cutting tool:

In the inner and outer adjusted positions, different cartridge pins can define the at least one active cartridge pin, for at least some of the insert cartridges.

Each sleeve adjustment groove can extend along a spiral.

Each spiral can be an Archimedean spiral, having a constant separation distance between successive turns.

The pitch angle of each spiral can be less than 10°.

The adjustment sleeve can comprise exactly one sleeve adjustment groove, with a spiral center contained at the holder central axis.

The exactly one sleeve adjustment groove can extend about the sleeve central axis between one and two turns.

The cartridge pins on the plurality of insert cartridges can project from the cartridge rearward surface of their respective insert cartridges at different locations thereon.

Each sleeve adjustment groove can intersect at least one of the sleeve through hole wall surface and the sleeve peripheral surface.

The rotational sleeve direction can be defined by the preceding direction.

The sleeve peripheral surface can be defined by an imaginary outer sleeve cylinder having an outer sleeve diameter. The sleeve through hole wall surface can be defined by an imaginary inner sleeve cylinder having an inner sleeve diameter ($D_{IS}$). The inner sleeve diameter can be greater than 70% of the outer sleeve diameter.

For at least one insert cartridge, two cartridge pins can be located in a respective one of the sleeve adjustment grooves defining two active cartridge pins.

Each insert cartridge can comprise a plurality of cartridge pins. For each insert cartridge, at least one of the cartridge pins may not be located in any of the sleeve adjustment groove (62), thereby defining an at least one non-active cartridge pin.

The forward body portion can comprise a plurality of cartridge pin storage channels recessed in the body forward surface, each associated with one of the body engagement surfaces. In the inner adjusted position, for at least one insert cartridge, any non-active cartridge pins which are located radially inwards from the at least one active cartridge pin can be located in one of the cartridge pin storage channels.

Each body engagement surface can comprise at least one linear engagement recess and/or at least one linear engagement projection. Each cartridge pin storage channel can be arranged in a linear manner, parallel to the at least one linear engagement recess and/or the at least one linear engagement projection of the associated body engagement surface.

In the outer adjusted position, for at least one insert cartridge, at least one non-active cartridge pin can be located radially outwards from the at least one active cartridge pin.

Each body engagement surface can comprise at least one linear engagement recess and/or at least one linear engagement projection. Each cartridge engagement surface can comprise at least one linear engagement recess and/or at least one linear engagement projection. The at least one engagement projection can be engaged to the at least one engagement recess.

Each body engagement surface can comprise a plurality of linear engagement recesses and a plurality of linear engagement projection. Each cartridge engagement surface can comprise a plurality of linear engagement recesses and a plurality of linear engagement projections. The linear engagement recesses can alternate with the linear engagement projections. The plurality of linear engagement recesses and the plurality of linear engagement projections can form a serrated engagement between the cartridge engagement surface and the respective body engagement surface.

Each insert cartridge can comprise a plurality of cartridge pins. For each insert cartridge, the plurality of cartridge pins can be arranged in a linear manner, parallel to the at least one linear engagement recess and/or the at least one linear engagement projection located at the cartridge engagement surface.

The at least one engagement projection and/or the at least one engagement recess provided at each body engagement surface can extend in the inward and outward adjustment directions. The inward and outward adjustment directions can be non-perpendicular to an axial pin half-plane containing the holder central axis and intersecting the at least one active cartridge pin.

In the inner and outer adjusted positions of the tool holder, the plurality of insert cartridges can be axially clamped to the holder body by a clamping arrangement.

The forward body portion can comprise a body threaded hole recessed in the body forward surface. The clamping arrangement can comprise a clamping plate comprising a plate through hole and a plurality of plate clamping portions. The clamping plate can be releasably attached to the tool holder by a plate retaining screw comprising a screw lower threaded portion, the plate retaining screw located in the plate through hole with the screw lower threaded portion threadingly engaged with the body threaded hole. Each plate clamping portion can clampingly engage a respective insert cartridge to the holder body.

Each insert cartridge can comprise a cartridge forward surface opposite the cartridge rearward surface and an elongated cartridge pin recess recessed in the cartridge forward surface. The clamping plate can comprise opposite plate forward and rearward surfaces and a plate peripheral surface extending therebetween and a plurality of plate pins projecting from the rearward plate surface. For each insert cartridge, a respective plate pin can be located in the cartridge pin recess.

The plate through hole can comprise a plate through hole threaded portion. The plate retaining screw can comprise a screw upper threaded portion, the screw lower threaded portion being of opposite helical direction to the screw upper threaded portion. The screw upper threaded portion can be threadingly engaged with the plate through hole threaded portion.

The adjustment sleeve can comprise a sleeve threaded through hole opening out to the sleeve through hole wall surface and the sleeve peripheral surface. The forward body portion can comprise an annular body securing groove recessed in the body peripheral surface and extending about the holder central axis. The adjustment sleeve can be releasably attached to the forward body portion by a securing screw located in the body securing groove and threadingly engaged with the sleeve threaded through hole.

BRIEF DESCRIPTION OF THE FIGURES

For a better understanding of the present application and to show how the same may be carried out in practice, reference will now be made to the accompanying drawings, in which.

Figure 1:
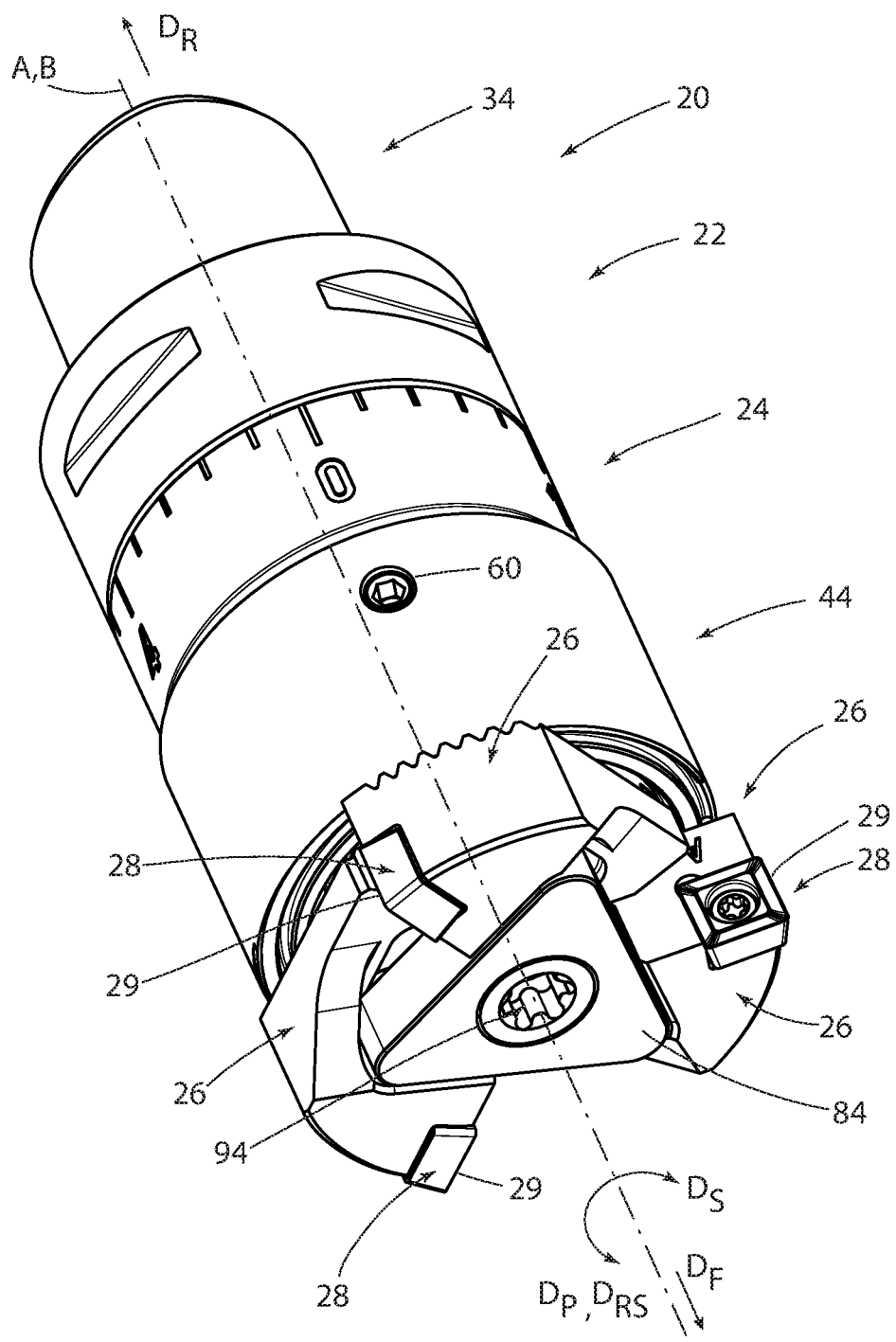
FIG. 1 is a perspective view of a rotary cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
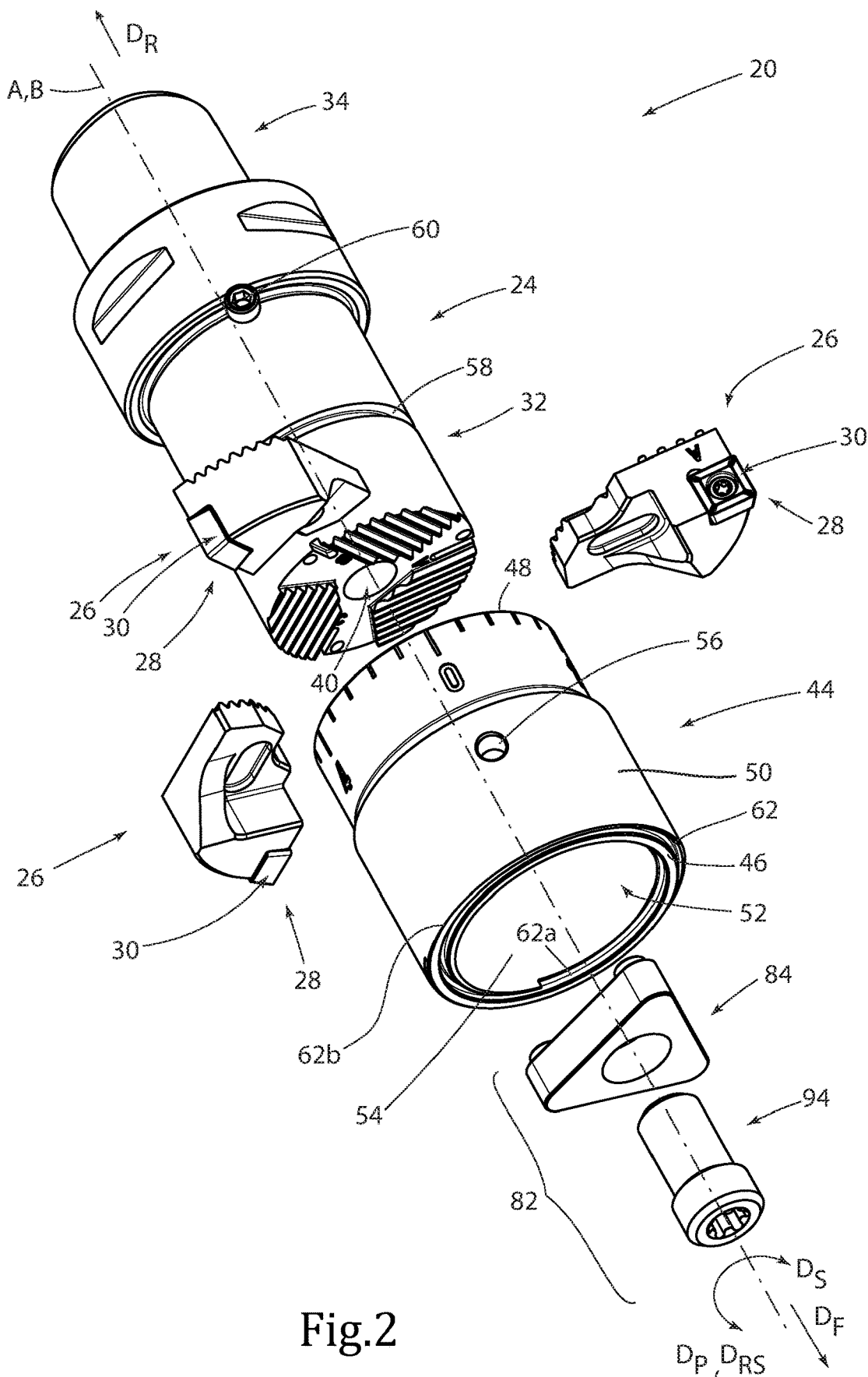
FIG. 2 is an exploded perspective view of the rotary cutting tool shown in FIG. 1.

Attention is first drawn to FIGS. 1 and 2 showing a rotary cutting tool 20, depicting an aspect of the present application. In this non-limiting example shown in the drawings, the rotary cutting tool 20 is a rotary boring tool, designed to increase the diameter of pre-existing holes. However, the subject matter of the present application is not restricted only to rotary boring tool and could also be applicable to, for example but not limited to, reaming tools. The rotary cutting tool 20 includes a tool holder 22 which has a holder body 24 and a plurality of insert cartridges 26. The plurality of insert cartridges 26 are circumferentially spaced apart. In this non-limiting example shown in the drawings, the tool holder 22 has exactly three insert cartridges 26. The insert cartridges 26 are releasably attached to the holder body 24. The rotary cutting tool 20 further includes a plurality of cutting inserts 28. Each cutting insert 28 has a circumferential cutting edge 29. Each cutting insert 28 is releasably retained in an insert pocket 30 of a respective insert cartridge 26. The rotary cutting tool 20 has a cutting diameter which defines the diameter of the hole in the workpiece after cutting (e.g. boring) has been performed. The tool holder 22 is adjustable between an inner adjusted position and an outer adjusted position. The inner adjusted position can correspond to a minimum cutting diameter. The outer adjusted position can correspond to a maximum cutting diameter.

Attention is again drawn FIGS. 1 and 2 also showing the tool holder 22, depicting another aspect of the present application. The tool holder 22 is configured to rotate about a holder central axis B. The holder central axis B defines opposite axially forward and rearward directions $D_F$, $D_R$. The holder central axis B also defines rotational preceding and succeeding directions $D_P$, $D_S$. The preceding direction $D_P$ is the cutting direction of the rotary cutting tool 20.

Figure 3:
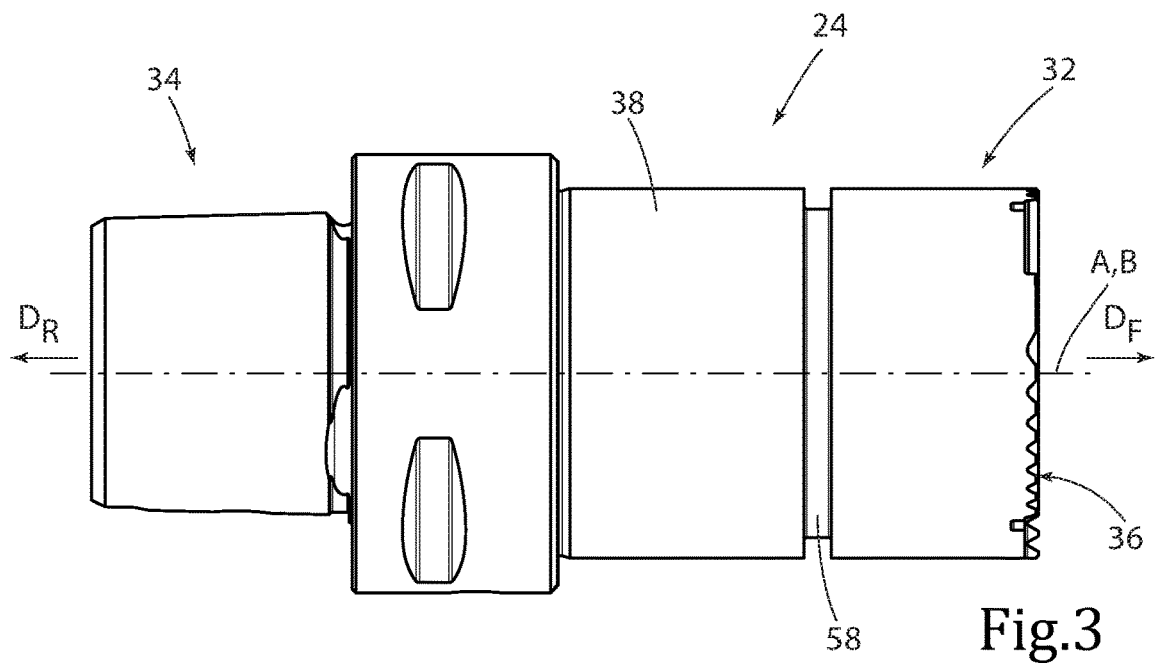
FIG. 3 is a side view of a tool holder shown in FIGS. 1 and 2.

It should also be noted that use of the terms "forward" and "rearward" throughout the description and claims refer to a relative position in a direction of the holder central axis B towards the left and right, respectively, in FIG. 3. In the present disclosure, "forward" is associated with the cutting end of the rotary cutting tool 20. It should also further be noted that use of the terms "axial" and "radial" throughout the description and claims are with respect to the holder central axis B, unless otherwise stated.

Reference is now made to FIG. 3. The tool holder 22 includes a holder body 24. The holder body 24 includes a forwardly disposed forward body portion 32 and a rearwardly disposed spindle portion 34. The spindle portion 34 is designed to receive torque from the CNC machine in order to rotate the tool holder 22. The forward body portion 32 includes a forward facing body forward surface 36 and a body peripheral surface 38. In accordance with some embodiments of the subject matter of the present application, the body forward surface 36 can be oriented perpendicular to the holder central axis B.

The body peripheral surface 38 extends about the holder central axis B and bounds the body forward surface 36. In accordance with some embodiments of the subject matter of the present application, the body peripheral surface 38 can be defined by an imaginary outer body cylinder $C_{OB}$ which is co-axial with the tool holder 22 and which has an outer body diameter $D_{OB}$.

Figure 4:
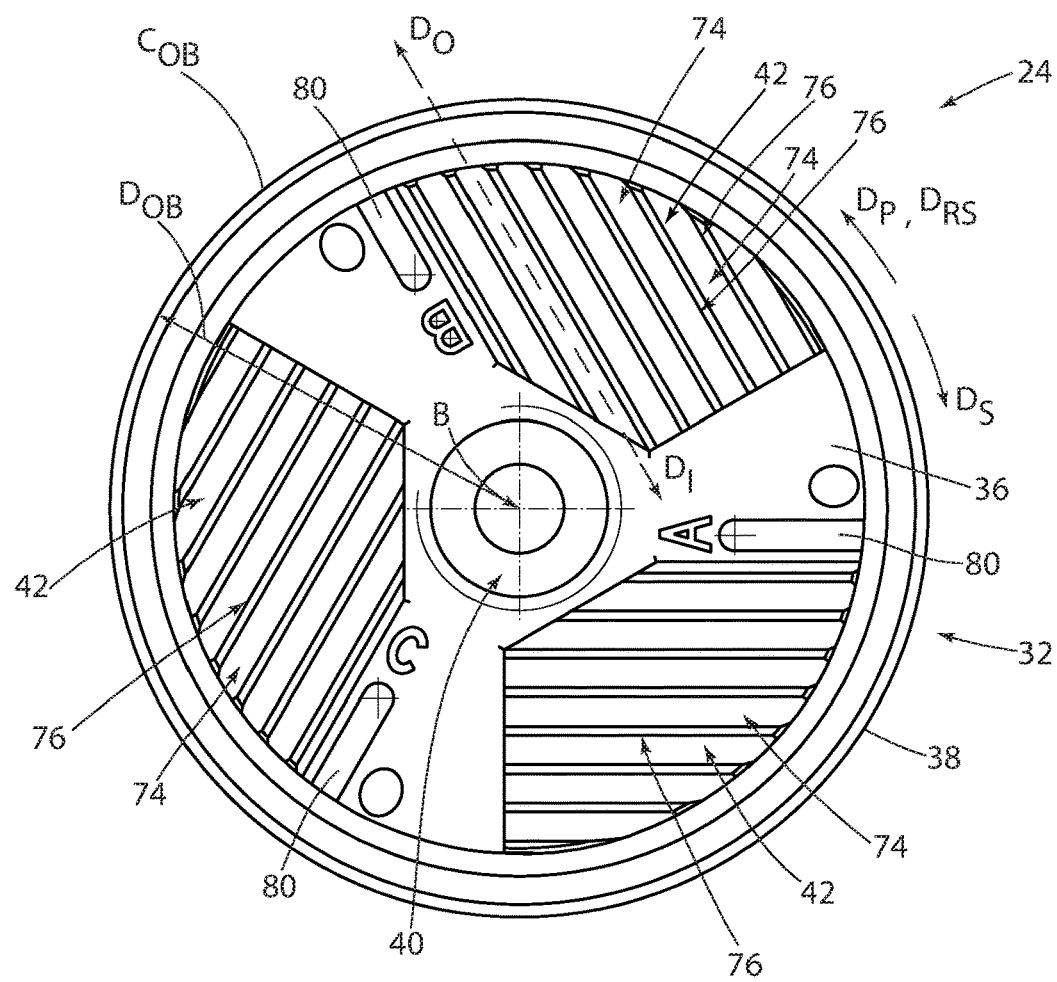
FIG. 4 is a front view of the tool holder shown in FIG. 3.

Referring to FIG. 4, the forward body portion 32 can include a body threaded hole 40 recessed in the body forward surface 36. The body threaded hole 40 is designed to threadingly receive a retaining screw which belongs to a clamping mechanism, and is discussed further on in the description. In accordance with some embodiments of the subject matter of the present application, the body threaded hole 40 can extend along the holder central axis B.

Referring again to FIG. 4 and also seen in FIG. 2, the body forward surface 36 includes a plurality of body engagement surfaces 42. The plurality of body engagement surfaces 42 are circumferentially spaced apart from one another about the holder central axis B and do not overlap one another. The plurality of body engagement surfaces 42 are designed to engage corresponding rear cartridge surfaces 66 on the insert cartridges 26, and are discussed further on in the description. The number of body engagement surfaces 42 corresponds to the number of insert cartridges 26. While in FIG. 4, the body engagement surfaces 42 are identical to one another, in some embodiments they may differ from one another.

Figure 5:
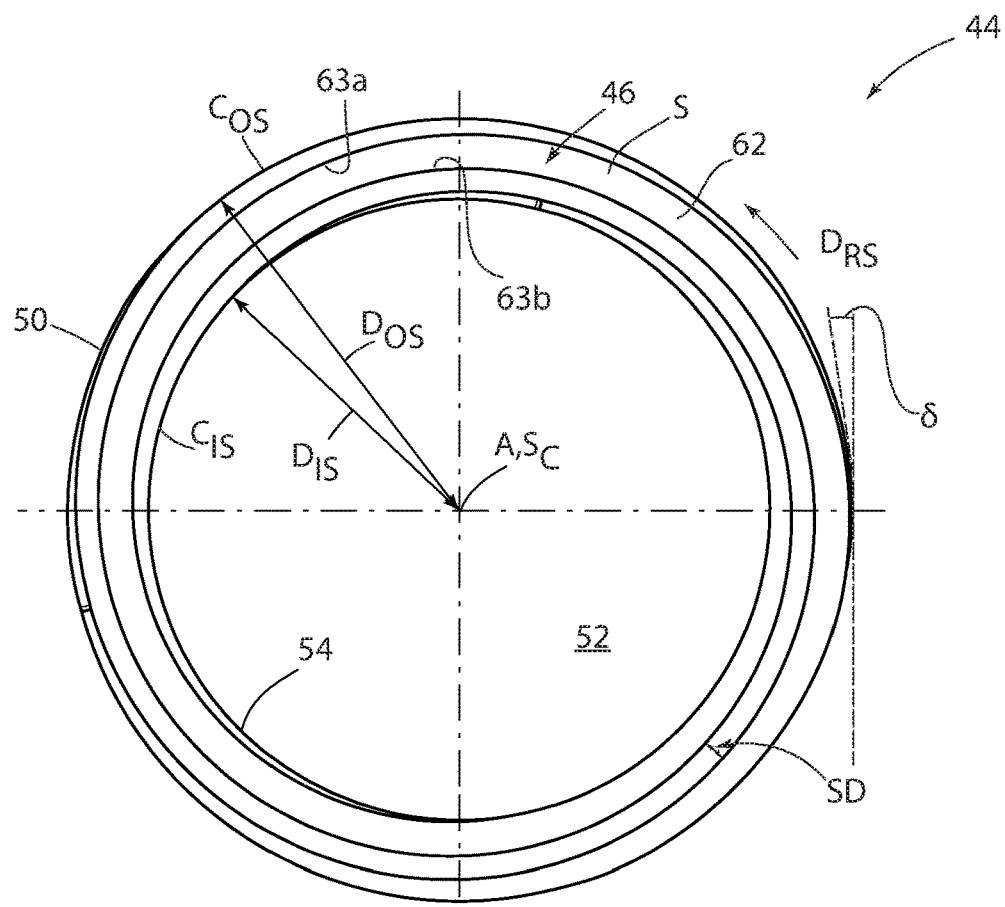
FIG. 5 is a front view of an adjustment sleeve shown in FIGS. 1 and 2.

Attention is now brought to FIG. 5 as well as FIG. 2. The tool holder 22 includes an adjustment sleeve 44. The adjustment sleeve 44 has a sleeve central axis A. The adjustment sleeve 44 includes opposite forward and rearward sleeve end surfaces 46, 48. In accordance with some embodiments of the subject matter of the present application, the forward and rearward sleeve end surfaces 46, 48 can be oriented perpendicular to the sleeve central axis A.

The adjustment sleeve 44 further includes a sleeve peripheral surface 50 which extends between the forward and rearward sleeve end surfaces 46, 48. The sleeve peripheral surface 50 extends about the sleeve central axis A. In accordance with some embodiments of the subject matter of the present application, the sleeve peripheral surface 50 can be defined by an imaginary outer sleeve cylinder $C_{OS}$ which has the sleeve central axis A as its axis and which has an outer sleeve diameter $D_{OS}$.

The adjustment sleeve 44 includes a sleeve through hole 52. The sleeve through hole 52 includes a sleeve through hole wall surface 54 which extends about the sleeve central axis A. Stated differently, the sleeve through hole 52 extends along the sleeve central axis A. The sleeve through hole wall surface 54 connects the forward and rearward sleeve end surfaces 46, 48. That is to say, the sleeve through hole 52 opens out to the forward and rearward sleeve end surfaces 46, 48.

In accordance with some embodiments of the subject matter of the present application, the sleeve through hole wall surface 54 can be defined by an imaginary inner sleeve cylinder $C_{IS}$ which has the sleeve central axis A as its axis and which has an inner sleeve diameter $D_{IS}$. The inner and outer sleeve cylinders $C_{IS}$, $C_{OS}$ can be co-axial (i.e. share the sleeve central axis A as their axes). The inner sleeve diameter $D_{IS}$ can be greater than 70% of the outer sleeve diameter $D_{OS}$.

The adjustment sleeve 44 is circumferentially disposed about the holder body 24, with the sleeve through hole wall surface 54 facing the body peripheral surface 38. The adjustment sleeve 44 is rotationally displaceable with respect to the forward body portion 32. That is to say, the adjustment sleeve 44 can be rotated relative to the forward body portion 32 (clearly, the inner sleeve diameter $D_{IS}$ is slightly greater than the outer body diameter $D_{OB}$ so clearance is provided to allow rotation of the adjustment sleeve 44). In such a configuration, the adjustment sleeve 44 and the tool holder 22 are co-axial. Moreover, generally speaking, the forward sleeve surface 46 can be level with the body forward surface 36 in the axial direction when the rotary cutting tool 20 is assembled (see FIG. 1).

Referring back to FIGS. 1 and 2, in accordance with some embodiments of the subject matter of the present application, the adjustment sleeve 44 can include a sleeve threaded through hole 56 opening out to the sleeve through hole wall surface 54 and the sleeve peripheral surface 50. Generally speaking, the sleeve threaded through hole 56 extends in a radial direction relative to the sleeve central axis A. As shown in FIG. 3, the forward body portion 32 can include an annular body securing groove 58 recessed in the body peripheral surface 38 and extending about the holder central axis B. As shown in FIG. 1, a securing screw 60 can be threadingly engaged with the sleeve threaded through hole 56 and also located in the body securing groove 58. The securing screw 60 does not firmly abut the body securing groove 58. In this configuration the adjustment sleeve 44 is releasably attached to the holder body 24 while allowing the adjustment sleeve 44 to be rotated.

As best seen in FIG. 5, the adjustment sleeve 44 includes at least one sleeve adjustment groove 62 recessed in the forward sleeve end surface 46. The at least one sleeve adjustment groove 62 extends about the sleeve central axis A. Each sleeve adjustment groove 62 includes radially inwardly and outwardly facing groove wall surface 63a, 63b that oppose each other in the widthwise direction of the sleeve adjustment groove 62. In any axial plane containing the holder central axis (B) and intersecting the at least one sleeve adjustment groove 62, the radially inwardly facing groove wall surface 63a is nearer the holder central axis B than the radially outwardly facing groove wall surface 63b. Any and all the sleeve adjustment grooves 62 extend with decreasing distance from the sleeve central axis A in a rotational sleeve direction $D_{RS}$ defined by one of the preceding and succeeding directions $D_P$, $D_S$. In accordance with some embodiments of the subject matter of the present application, the rotational sleeve direction $D_S$ is defined by the preceding direction $D_P$ and is also the cutting direction of the rotary cutting tool 20. Each sleeve adjustment groove 62 can intersect at least one of the sleeve through hole wall surface 54 and the sleeve peripheral surface 50. More specifically, the sleeve adjustment groove 62 can intersect the sleeve through hole wall surface 54 at a groove inner opening 62a and the sleeve adjustment groove 62 can intersect the sleeve peripheral surface 50 at a groove outer opening 62b. The groove inner opening 62a is radially nearer the holder central axis B than the groove outer opening 62b In accordance with some embodiments of the subject matter of the present application, each sleeve adjustment groove 62 can extend along a spiral S. The spiral S has a spiral center $S_C$ and a pitch angle δ. The pitch angle δ defines the magnitude of radial adjustment of the insert cartridges 26 for a pre-determined degree of rotation of the adjustment sleeve 44. The lower the value of the pitch angle δ, the finer radial adjustment of the insert cartridges 26. Each spiral S can be an Archimedean spiral which has a constant separation distance SD between successive turns. The pitch angle δ of each spiral S can be less than 10°. It should be understood that use of the terms "pitch angle" throughout the description and claims refer to the angle the spiral makes with circles centered at the spiral center $S_C$.

In accordance with some embodiments of the subject matter of the present application, the adjustment sleeve 44 can include exactly one sleeve adjustment groove 62. The exactly one sleeve adjustment groove 62 can extend continuously (i.e. uninterruptedly) about the spiral center $S_C$. The spiral center $S_C$ can be contained at the holder central axis B. The exactly one sleeve adjustment groove 62 can extend about the sleeve axis A between one and two turns (where one turn is equal to 360 degrees).

Figure 6:
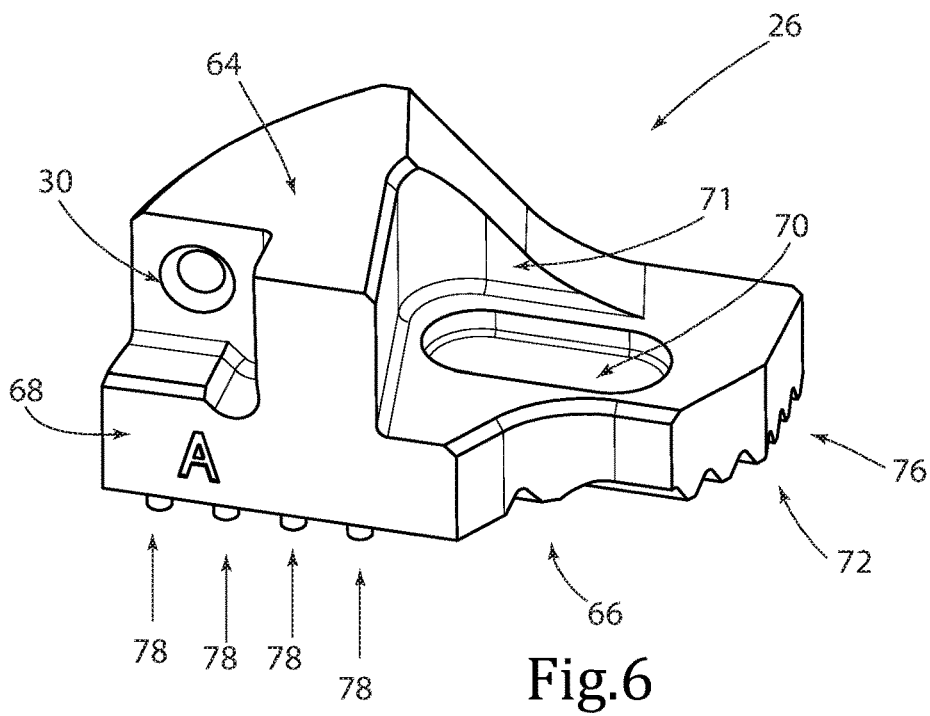
FIG. 6 is a perspective view of an insert cartridge shown in FIGS. 1 and 2.
Figure 7:
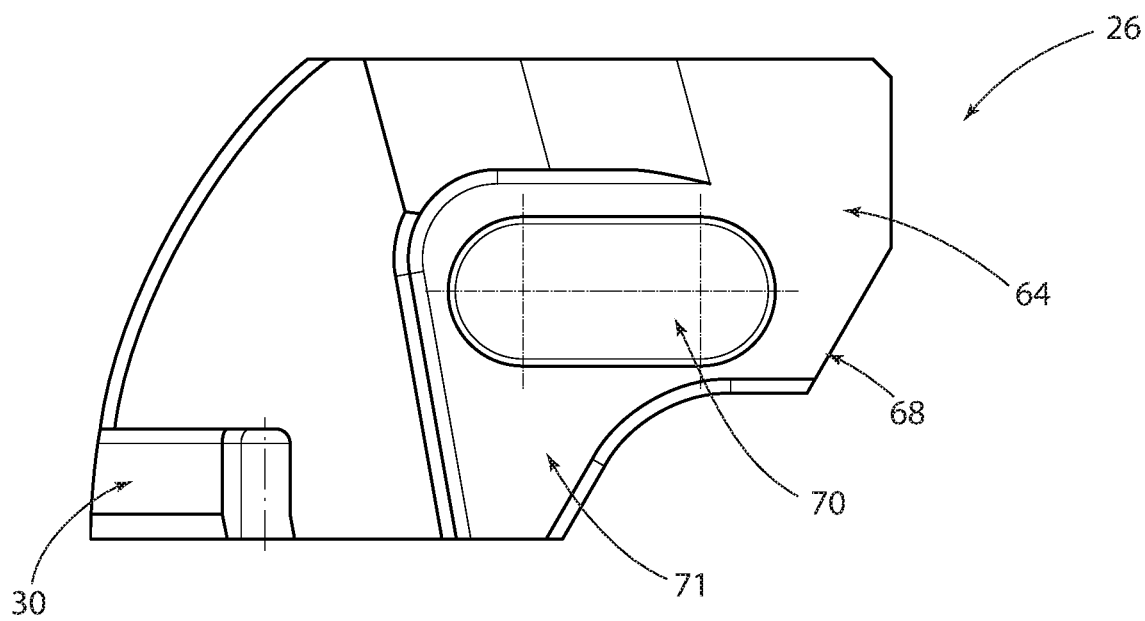
FIG. 7 is a top view of the insert cartridge shown in FIG. 6.
Figure 8:
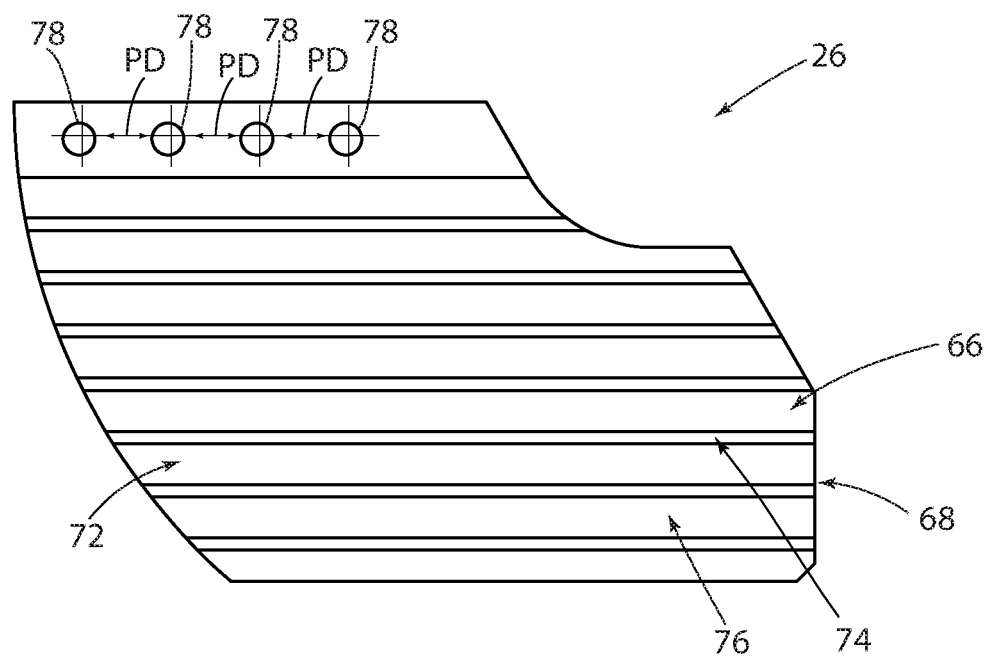
FIG. 8 is a bottom view of the insert cartridge shown in FIG. 6.
Figure 9:
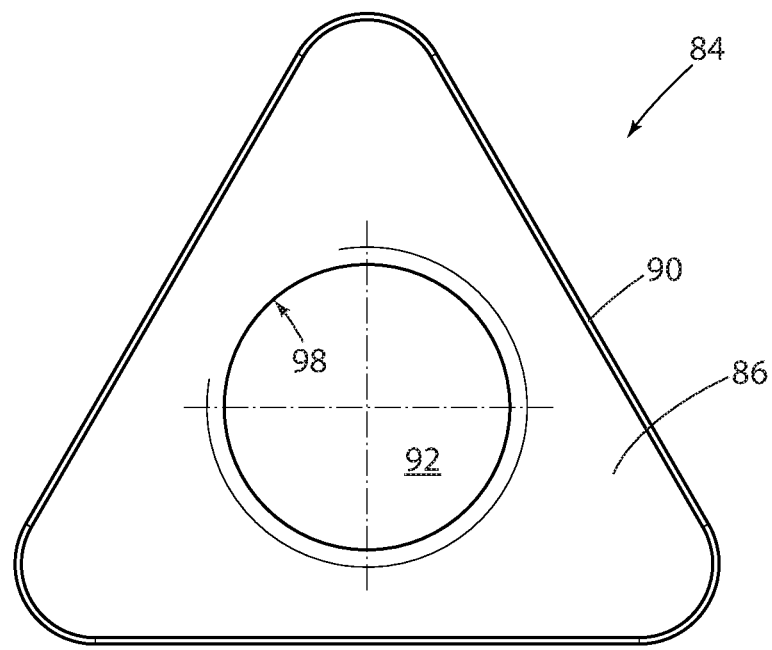
FIG. 9 is a top view of a clamping plate shown in FIGS. 1 and 2.
Figure 10:
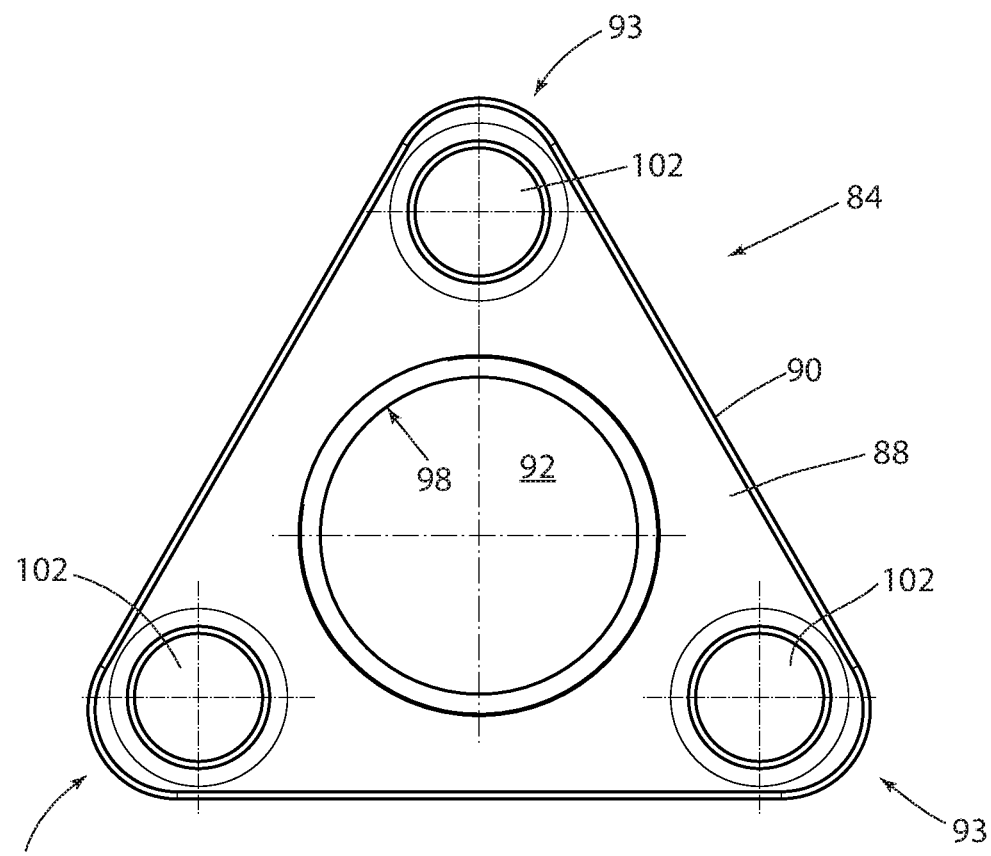
FIG. 10 is a bottom view of the clamping plate shown in FIG. 9.
Figure 11:
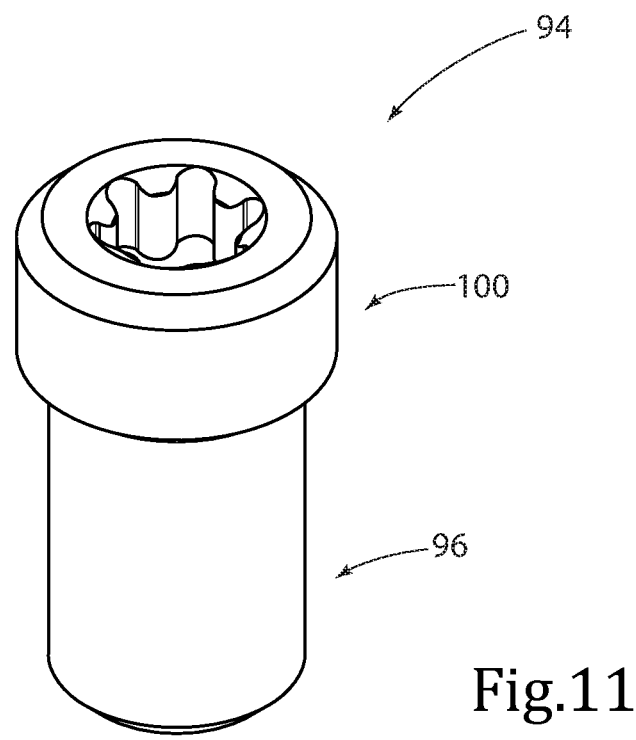
FIG. 11 is a perspective view of a plate retaining screw shown in FIGS. 1 and 2.

Reference is now made to FIGS. 6 to 8 showing one of the plurality of insert cartridges 26. Each insert cartridge 26 includes opposite cartridge forward and rearward surfaces 64, 66. Each insert cartridge 26 further includes a cartridge peripheral surface 68 which extends between the cartridge forward and rearward surfaces 64, 66. The insert cartridge 26 also includes an insert pocket 30, for releasably retaining a respective cutting insert 28 therein. The insert pocket 30 opens out to the cartridge forward surface 64 and cartridge peripheral surface 68. When the rotary cutting tool 20 is assembled, the insert pocket 30 is disposed at the circumference of the tool holder 22. Additionally, the insert pocket 30 is disposed at a rotationally preceding portion of the insert cartridge 26.

In accordance with some embodiments of the subject matter of the present application, the insert cartridge 26 can include a cartridge pin recess 70 recessed in the cartridge forward surface 64. The cartridge pin recess 70 is designed to receive a corresponding portion (e.g. pin) of a clamping member (e.g., plate) belonging to a clamping mechanism and is discussed further on in the description. The cartridge pin recess 70 can be a blind hole. Preferably, the insert cartridge 26 can include a clamping pocket 71, recessed at least partially in the cartridge forward surface 64. The cartridge pin recess 70 can be located at the clamping pocket 71. The cartridge pin recess 70 can be elongated to allow the insert cartridge 26 to be freely displaced even though the pin of a clamping member (for example) is still located therein.

The cartridge rearward surface 66 includes a cartridge engagement surface 72. The shape of the cartridge engagement surface 72 corresponds to the shape of a respective body engagement surface 42. The cartridge engagement surface 72 is slidingly displaceable with respect to the respective body engagement surface 42. Moreover, the cartridge engagement surface 72 is mutually engaged with the respective body engagement surface 42 so that the insert cartridge 26 is displaceable in opposite inward and outward adjustment directions $D_I$, $D_O$. In accordance with some embodiments of the subject matter of the present application, the tool holder 22 is configured so that a displacement of any insert cartridge 26 in the inward and outward adjustment directions $D_I$, $D_O$ results in the insert pocket 30, and in particular, the cutting edge 29 being displaced in a radial direction. That is to say, in a view along the holder central axis B, the inward and outward adjustment directions $D_I$, $D_O$ are parallel to a radial line intersecting the holder central axis B and the cutting edge 29. However, in the embodiment shown, the inward outward adjustment directions $D_I$, $D_O$ neither pass through nor intersect the holder central axis B and thus are skew to the holder central axis B.

In accordance with some embodiments of the subject matter of the present application, the tool holder 22 can include at least one engagement recess 74 recessed in one or both of the cartridge engagement surface 72 and the respective body engagement surface 42. The tool holder 22 additionally can include at least one engagement projection 76 projecting from one or both of the cartridge engagement surface 72 and the respective body engagement surface 42. Stated differently, each body engagement surface 42 can include at least one linear engagement recess 74 and/or at least one linear engagement projection 76 and each cartridge engagement surface 72 can include at least one linear engagement recess 74 and/or at least one linear engagement projection 76. As best seen in FIG. 4, the body forward surface 36 is devoid of such engagement recesses 74 and/or engagement projections 76 in regions between the circumferentially spaced apart, non-overlapping body engagement surfaces 42.

The at least one engagement recess 74 can extend in a straight (i.e. linear) manner. The at least one engagement projection 76 can extend in a straight (linear) manner. The at least one engagement projection 76 and/or the at least one engagement recess 74 provided at each body engagement surface 42 extends in the inward and outward adjustment directions $D_I$, $D_O$. The at least one engagement projection 76 and/or the at least one engagement recess 74 located at each body engagement surface 42 can extend to the body peripheral surface 38. The at least one engagement projection 76 can be engaged to the at least one engagement recess 74. It is noted that such a configuration allows movement of the insert cartridge 26 only in the inward and outward adjustment directions $D_I$, $D_O$.

In accordance with some embodiments of the subject matter of the present application, the tool holder 22 can include exactly one engagement recess 74 recessed in one of the cartridge engagement surface 72 and the respective body engagement surface 42. The tool holder 22 additionally can include exactly one engagement projection 76 projecting from the other one of the cartridge engagement surface 72 and the respective body engagement surface 42.

In accordance with some other embodiments of the subject matter of the present application, the at least one linear engagement recess 74 can include a plurality of engagement recesses 74 which are parallel with each other. The at least one linear engagement projection 76 can include a plurality of engagement projections 76 which are parallel with each other. Thus, as seen in FIG. 4, within each body engagement surface 42, the plurality of engagement recesses 74 may alternate with the plurality of engagement projections 76 and have a common angular orientation. Moreover, the alternating linear engagement recesses 74 and engagement projections 76 of different body engagement surfaces 42 have different angular orientations.

In the figures, both the body engagement surface 44 and the cartridge engagement surface 72 are provided with linear engagement recesses 74 alternating with linear engagement projections 76, and the two surfaces 42, 72 engage one another in a complementary manner with the engagement projections 76 of each occupying the engagement recesses 74 of the other. Each pair of linear engagement projections 76 is connected by a respective linear engagement recess 74. Thus, a serrated engagement can be formed between the cartridge engagement surface 72 and the respective body engagement surface 42, when the plurality of engagement projections 76 engage the plurality of engagement recesses 74.

Figure 12:
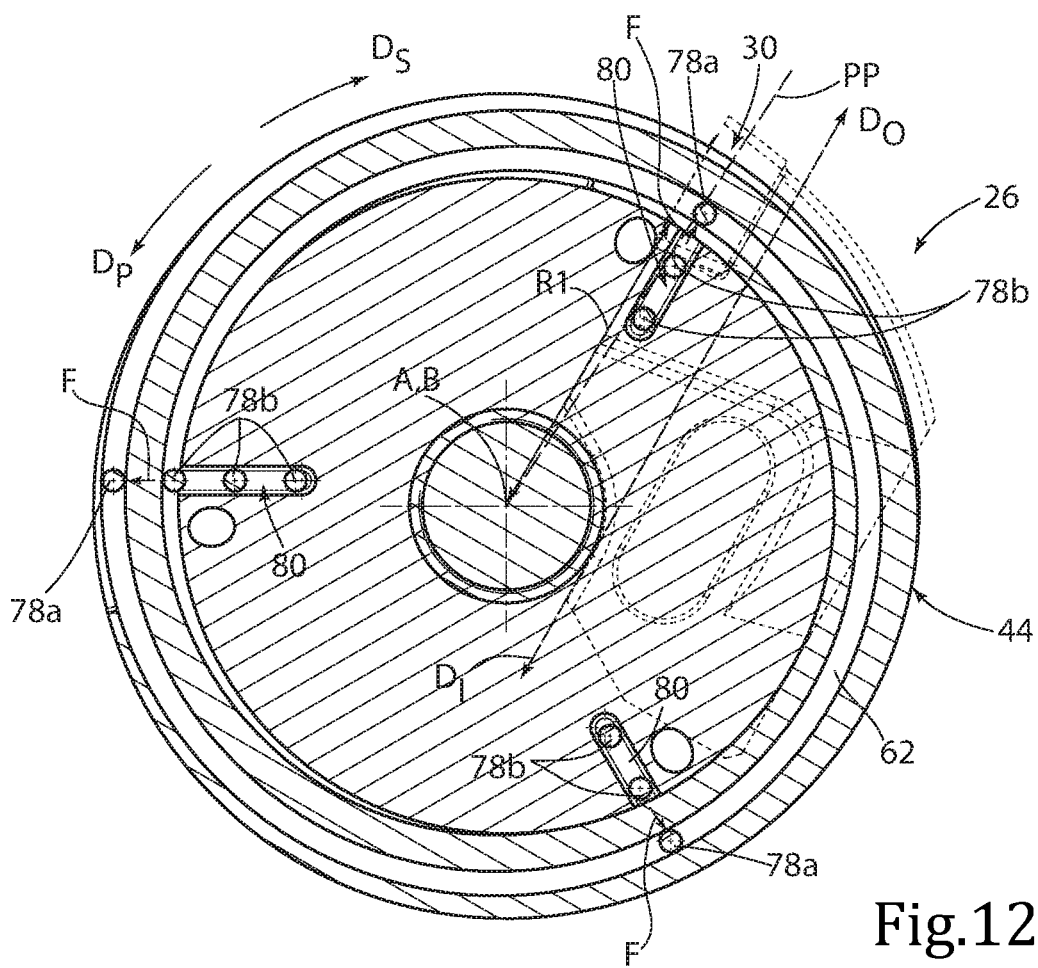
FIG. 12 is a cross sectional view taken in a radial plane when the tool holder is in an inner adjusted position, with the contour of one insert cartridge superimposed thereon.
Figure 13:
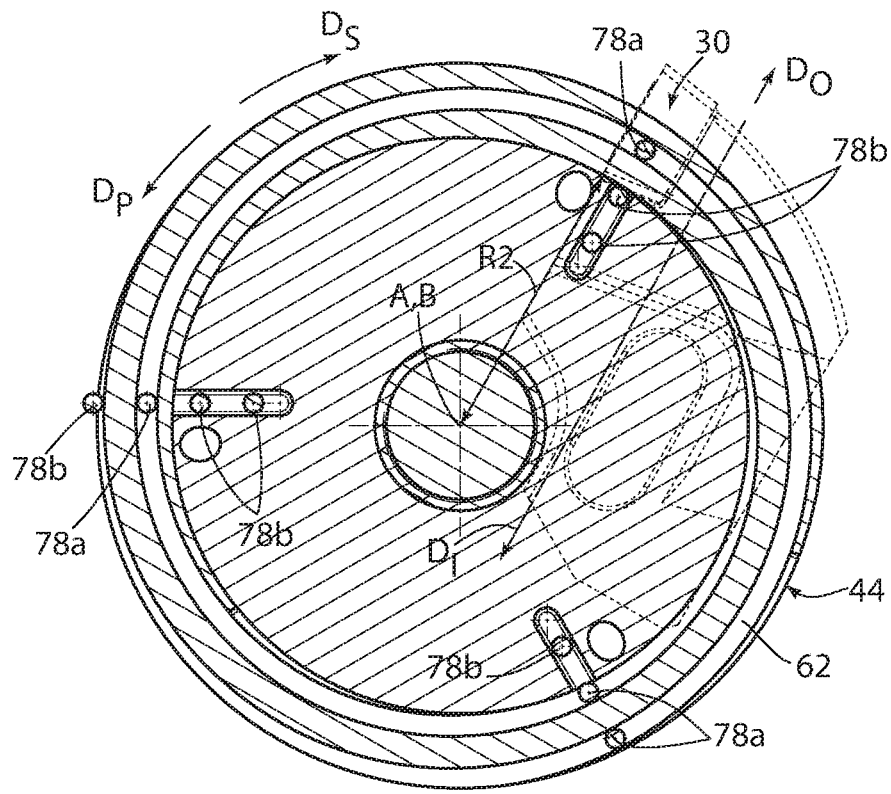
FIG. 13 is an analogous view shown in FIG. 12, when the tool holder is in a first outer adjusted position.
Figure 14:
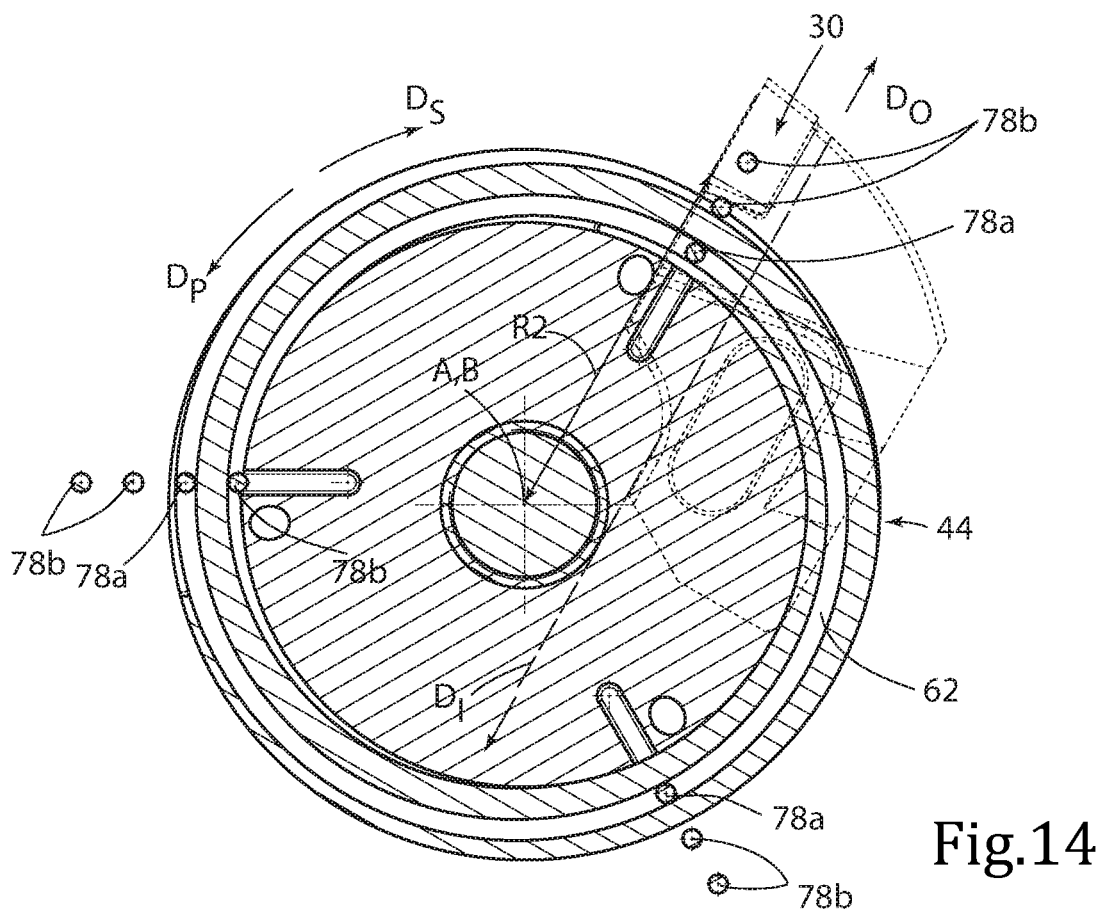
FIG. 14 is an analogous view shown in FIG. 12, when the tool holder is in a second outer adjusted position, which is further outward than the first outer adjusted position.

Each insert cartridge 26 further includes at least one cartridge pin 78. The at least one cartridge pin 78 projects from the cartridge rearward surface 66. In accordance with some embodiments of the subject matter of the present application, each of the insert cartridges 26 can have a different number of cartridge pins 78 thereon. Referring to FIGS. 12-14, in this non-limiting example, two of the insert cartridges 26 have three cartridge pins 78 and one of the insert cartridges 26 has four cartridge pins 78. Moreover, the cartridge pins 78 projecting from the cartridge rearward surface 66 of one cartridge 26 may do so at locations different from those of other cartridges. Thus, the plurality of insert cartridge 26 may not be not identical to one another. For the configuration with the adjustment sleeve 44 having exactly one sleeve adjustment groove 62, this allows all the insert cartridges 26 to be located at the same radial distance from the holder central axis B.

For each insert cartridge 26, at least one of the cartridge pins 78 is located in a respective one of the sleeve adjustment grooves 62, thereby defining an at least one active cartridge pin 78a. The purpose of the active cartridge pin 78a is to provide an engagement with the engagement projection 76 which allows urging of the insert cartridge 26 in the inward and outward adjustment directions $D_I$, $D_O$, upon rotation of the adjustment sleeve 44 relative to the holder body's forward body portion 32. It is noted that the inward and outward adjustment directions $D_I$, $D_O$ are non-perpendicular to an axial pin half-plane PP which contains the holder central axis B and intersects the at least one active cartridge pin 78a. Otherwise, displacement of the insert cartridge 26 would be prevented.

In the configuration where each sleeve adjustment groove 62 intersects at least one of the sleeve through hole wall surface 54 and the sleeve peripheral surface 50, a cartridge pin 78 can be located partly in the respective sleeve adjustment groove 62 and partly not located in the respective sleeve adjustment groove 62 (i.e. by extending beyond the groove inner opening 62a or the groove outer opening 62b). It is noted however that such a cartridge pin 78 is not defined as an active cartridge pin 78a.

In accordance with some embodiments of the subject matter of the present application, for at least one insert cartridge 26, two cartridge pins 78 are located in a respective one of the sleeve adjustment grooves 62 defining two active cartridge pins 78a.

In accordance with some embodiments of the subject matter of the present application, each insert cartridge 26 can include a plurality of cartridge pins 78. For each insert cartridge 26, the plurality of cartridge pins 78 can be arranged in a linear manner, having the same linear direction as the at least one linear engagement recess 74 and/or the at least one linear engagement projection 76 located at the cartridge engagement surface 72. In other words, the plurality of cartridge pins 78 extend in a direction parallel to the at least one linear engagement recess 74 and/or the at least one linear engagement projection 76 located at the cartridge engagement surface 72. Each of the plurality of linearly arranged cartridge pins 78 can be spaced apart from its neighboring pins by a pin distance PD. Generally speaking, the pin distance PD can be equal to the separation distance SD.

In accordance with some embodiments of the subject matter of the present application, for each insert cartridge 26, at least one of the cartridge pins 78 may be not located in any of the sleeve adjustment grooves 62, thereby defining at least one non-active cartridge pin 78b. In accordance with the discussion on active cartridge pins 78a above, a cartridge pin 78 which is located partly in the respective sleeve adjustment groove 62 and partly not located in the respective sleeve adjustment groove 62 is defined as a non-active cartridge pin 78b. Thus, in any given position of the tool holder 22 (and at any given time), each cartridge pin 26 is either active or non-active, but is not both or neither.

Referring to FIG. 4, each of the body engagement surfaces 42 can have an associated pin storage channel 80 recessed in the body forward surface 36. Thus, the forward body portion 32 can include a plurality of cartridge pin storage channels 80 recessed in the body forward surface 36. The number of cartridge pin storage channels 80 corresponds to the number of body engagement surfaces 42, and thus to the number of insert cartridges 26. In accordance with some embodiments of the subject matter of the present application, each cartridge pin storage channel 80 can be arranged in a linear manner, having the same linear direction as the at least one linear engagement recess 74 and/or the at least one linear engagement projection 76 is located at the body engagement surface 42. In other words, each pin storage channel 80 extends in a direction parallel to the linear engagement recess 74 or the linear engagement projection 76 of the associated body engagement surface 42. The purpose of the cartridge pin storage channels 80 is described later in the description.

Attention is drawn to FIG. 12, showing the tool holder 22 in the inner adjusted position. In the inner adjusted position, the adjustment sleeve 44 is located at a first angular position relative to the holder central axis B. Each insert pocket 30 is spaced apart from the holder central axis B by a respective first radial pocket distance R1. In accordance with some embodiments of the subject matter of the present application, in the inner adjusted position, for at least one insert cartridge 26, any non-active cartridge pins 78b which are located radially inwards from the at least one active cartridge pin 78a can be located in one of the cartridge pin storage channels 80.

In accordance with some embodiments of the subject matter of the present application, in any of the adjusted positions of the tool holder 22 (e.g., in either the inner or outer adjusted positions), the plurality of insert cartridges 26 can be axially clamped to the holder body 24 by a clamping arrangement 82.

In accordance with some embodiments of the subject matter of the present application, the clamping arrangement 82 can include a clamping plate 84. The clamping plate 84 can include opposite plate forward and rearward surfaces 86, 88 and a plate peripheral surface 90 extending therebetween.

The clamping plate 84 can include a plate through hole 92. The plate through hole 92 can open out to the plate forward and rearward surfaces 86, 88. The clamping plate 84 can include a plurality of plate clamping portions 93. The number of clamping portions corresponds to the number of insert cartridges 26. In this non-limiting example shown in the drawings, the clamping plate 84 has a triangular shape with three plate clamping portions 93.

The clamping plate 84 can be releasably attached to the tool holder 22 by a plate retaining screw 94. The plate retaining screw 94 can include a screw lower threaded portion 96. The plate retaining screw 94 can be located in the plate through hole 92 with the screw lower threaded portion 96 threadingly engaged with the body threaded hole 40. Each plate clamping portion 93 can clampingly engage a respective insert cartridge 26 to the holder body 24.

In accordance with some embodiments of the subject matter of the present application, the plate through hole 92 can include a plate through hole threaded portion 98. The plate retaining screw 94 can include a screw upper threaded portion 100. The screw lower threaded portion 96 can be of opposite helical direction to the screw upper threaded portion 100. The screw upper threaded portion 100 can be threadingly engaged with the plate through hole threaded portion 98. In such a configuration there is no conical countersink (not shown) for receiving the head of the plate retaining screw 94. This is advantageous in a small rotary cutting tools 20 having a correspondingly small clamping plate 84, given limited space for a conical countersink.

In accordance with some embodiments of the subject matter of the present application, the clamping plate 84 can include a plurality of plate pins 102 which project from the plate rearward surface 88. The number of plate pins 102 corresponds to the number of insert cartridges 26. For each insert cartridge 26, a respective plate pin 102 can be located in the cartridge pin recess 70. This prevents the insert cartridges 26 from falling from the tool holder 22 when adjusting the position of the tool holder 22.

Alternatively, in accordance with some other embodiments of the subject matter of the present application, the clamping arrangement 82 can include a plurality of clamping screws with each insert cartridge 26 being individually axially clamped to the holder body 24 by a respective clamping screw without a clamping plate (not shown).

Adjustment of the tool holder 22 from the inner adjusted position to the outer adjusted position is accomplished by performing the following steps. In accordance with some embodiments of the subject matter of the present application, the axially clamped plurality of insert cartridges 26 are unclamped sufficiently to allow their displacement in the inward and outward adjustment directions $D_I$, $D_O$. In this non-limiting example shown in the drawings, this is accomplished by partially unscrewing the plate retaining screw 94. Alternatively, for the configuration described above that includes a plurality of clamping screws, each clamping screw is individually partially unscrewed. The adjustment sleeve 44 is rotated about the holder central axis B in the rotational sleeve direction $D_{RS}$. As the adjustment sleeve 44 is rotated, the outwardly facing groove wall surface 63b initially abuts the at least one active cartridge pin 78a. Upon further subsequent rotation, by virtue of the sleeve adjustment grooves 62 extending with decreasing distance from the sleeve central axis A in the rotational sleeve direction $D_{RS}$, the outwardly facing groove wall surface 63b applies a radial adjustment force F on the at least one active cartridge pin 78a on each insert cartridge 28 in the radially outward direction. The adjustment force simultaneously urges the insert cartridges 26 to be displaced in the outward adjustment direction $D_O$.

It is noted that, in accordance with some embodiments of the subject matter of the present application, for some insert cartridges 26, during rotation of the adjustment sleeve 44 in the rotational sleeve direction $D_{RS}$, one of the active cartridge pins 78a can "exit" a respective one of the sleeve adjustment grooves 62 via the groove outer opening 62b. In such case, the active cartridge pin 78a is no longer located in a respective one of the sleeve adjustment grooves 62 and becomes a non-active cartridge pin 78b. Likewise, for some insert cartridges 26, one of the non-active cartridge pins 78a can "enter" a respective one of the sleeve adjustment grooves 62 via the groove inner opening 62a. Thus, the non-active cartridge pin 78b is located in a respective one of the sleeve adjustment grooves 62 and becomes an active cartridge pin 78b. It is noted that the for each full turn of the adjustment sleeve 44 (i.e. turn of 360°), one active cartridge pin 78a can become a non-active cartridge pin 78b and one non-active cartridge pin 78b can become an active cartridge pin 78a. Accordingly, in the configuration with a plurality of cartridge pins, and provided that the separation distance SD corresponds to the pin distance PD, the adjustment sleeve 44 can be fully turned (i.e. turned 360°) N times where N equals the number of cartridge pins on the insert cartridge 26. Advantageously, this increases the maximum cutting diameter.

Attention is drawn to FIGS. 13 and 14, showing the tool holder 22 in two outer adjusted positions of the tool holder 22. In the outer adjusted position, the adjustment sleeve 44 is rotated by a rotational angle α relative to the first angular position.

In the outer adjusted position shown in FIG. 13, the rotational angle α is equal to 135 (i.e. less than half a turn). In the outer adjusted position shown in FIG. 14, the rotational angle α is equal to 7200 (i.e. two turns). The adjustment sleeve 44 is located at a second angular position relative to holder central axis B. It is noted, as shown in FIG. 14, that when the adjustment sleeve 44 is rotated a complete full exact turn (i.e. 360°), or any multiple thereof, the first angular position and the second angular position are the same. Otherwise, as shown in FIG. 13, the first angular position and the second angular position are different. However, in both FIG. 13 and FIG. 14, the adjustment sleeve 44 is considered to be rotationally offset from its inner adjusted position (in FIG. 14, by 720°).

Each insert pocket 30 is spaced apart from the holder central axis B by a respective second radial pocket distance R2. The second radial pocket distance R2 is greater than the first radial pocket distance R1, for each insert cartridge 26.

In accordance with some embodiments of the subject matter of the present application, as shown in FIG. 14, for at least one insert cartridge 26, at least one non-active insert pin 78b can be located radially outwards from the at least one active insert pin 78a.

In accordance with some embodiments of the subject matter of the present application, in the inner and outer adjusted positions, different cartridge pins 78 can define the at least one active cartridge pin 78a, for at least some of the insert cartridges 26.

Adjustment of the tool holder 22 from the outer adjusted position to the inner adjusted position is accomplished by performing the reverse steps. The adjustment sleeve 44 is rotated about the holder central axis B relative to the holder body's forward body portion 32 in a rotational direction opposite the rotational sleeve direction $D_{RS}$. The inwardly facing groove wall surface 63a initially abuts and then applies a radial adjustment force F to the at least one active cartridge pin 78a on each insert cartridge 28 in the inward direction. The adjustment force simultaneously urges the insert cartridges 26 to be displaced in the inward adjustment direction $D_O$, thereby displacing the insert pockets 30 so that they are once again spaced apart from the holder central axis B by the first radial pocket distance R1.

Although the subject matter of the present application has been described to a certain degree of particularity, it should be understood that various alterations and modifications could be made without departing from the spirit or scope of the invention as hereinafter claimed.

What is claimed is:

1. A tool holder (22) configured for rotation about a holder central axis (B) defining opposite axially forward and rearward directions ($D_F$, $D_R$), and opposite rotational preceding and succeeding directions ($D_P$, $D_S$) with the preceding direction ($D_P$) being a single cutting direction, the tool holder (22) comprising:

a holder body (24) comprising a forwardly disposed forward body portion (32), the forward body portion (32) comprising a generally forward facing body forward surface (36) and a body peripheral surface (38) which extends about the holder central axis (B) and bounds the body forward surface (36), the body forward surface (36) comprising:
  a plurality of body engagement surfaces (42) which are circumferentially spaced apart from one another about the holder central axis (B) and which define a plane perpendicular to said holder central axis (B), each body engagement surface comprising at least one engagement recess (74) and/or at least one engagement projection (76), with the body forward surface (36) being devoid of such engagement recesses (74) and/or engagement projections (76) in regions between the circumferentially spaced apart body engagement surfaces (42);
an adjustment sleeve (44) having a sleeve central axis (A), the adjustment sleeve (44) comprising:
  opposite forward and rearward sleeve end surfaces (46, 48) and a sleeve peripheral surface (50) extending therebetween;
  a sleeve through hole (52) comprising a sleeve through hole wall surface (54) which extends about the sleeve central axis (A) and connects the forward and rearward sleeve end surfaces (46, 48); and
  at least one sleeve adjustment groove (62) recessed in the forward sleeve end surface (46), any and all of the sleeve adjustment grooves (62) spiraling inward in a rotational sleeve direction ($D_{RS}$) defined by one of the preceding and succeeding directions ($D_P$, $D_S$); and
a plurality of insert cartridges (26), each insert cartridge (26) comprising:
  an insert pocket (30);
  a rearward facing cartridge rearward surface (66) comprising a cartridge engagement surface (72) which is mutually engaged with a respective one of said plurality of body engagement surfaces (42) so that the insert cartridge (26) is displaceable in opposite inward and outward adjustment directions ($D_I$, $D_O$); and
  at least one cartridge pin (78) projecting from the cartridge rearward surface (66),
wherein:
  the adjustment sleeve (44) is circumferentially disposed about the holder body (24), with the sleeve through hole wall surface (54) facing the body peripheral surface (38) so that the adjustment sleeve (44) is rotationally displaceable with respect to the forward body portion (32);
  at least one of the at least one cartridge pin (78) is located in a respective one of the sleeve adjustment grooves (62) defining at least one active cartridge pin (78a); and
  the tool holder (22) is adjustable between an inner adjusted position and an outer adjusted position upon rotation of the adjustment sleeve (44) about the holder axis (B) in the rotational sleeve direction ($D_{RS}$); wherein
    in the inner adjusted position:
      each insert pocket (30) is spaced apart from the holder central axis (B) by a respective first radial pocket distance (R1); and
    in the outer adjusted position:
      each insert pocket (30) is spaced apart from the holder central axis (B) by a respective second radial pocket distance (R2), the second radial pocket distance (R2) being greater than the first radial pocket distance (R1).

2. The tool holder (22), according to claim 1, wherein:
for each insert cartridge (26), the at least one cartridge pin (78) comprises a plurality of cartridge pins (78); and
in the inner and outer adjusted positions, different cartridge pins (78) define the at least one active cartridge pin (78a), for at least some of the insert cartridges (26).

3. The tool holder (22), according to claim 1, wherein each sleeve adjustment groove (62) extends along a respective spiral (S).

4. The tool holder (22), according to claim 3, wherein the spiral (S) associated with each sleeve adjustment groove, is an Archimedean spiral, having a constant separation distance (SD) between successive turns and a pitch angle (δ).

5. The tool holder (22), according to claim 3, wherein a pitch angle (δ) of the spiral (S) associated with each sleeve adjustment groove, is less than 10°.

6. The tool holder (22), according to claim 3, wherein the adjustment sleeve (44) comprises exactly one sleeve adjustment groove (62), with a spiral center ($S_C$) contained at the holder central axis (B).

7. The tool holder (22), according to claim 6, wherein the exactly one sleeve adjustment groove (62) extends about the sleeve central axis (A) between one and two turns.

8. The tool holder (22), according to claim 7, wherein:
for each insert cartridge (26), the at least one cartridge pin (78) comprises a plurality of cartridge pins (78); and
the cartridge pins (78) on the plurality of insert cartridges (26) project from the cartridge rearward surface (66) of their respective insert cartridges (26) at different locations thereon.

9. The tool holder (22), according to claim 1, wherein each sleeve adjustment groove (62) intersects at least one of the sleeve through hole wall surface (54) and the sleeve peripheral surface (50).

10. The tool holder (22), according to claim 1, wherein the rotational sleeve direction ($D_{RS}$) is defined by the preceding direction ($D_P$).

11. The tool holder (22), according to claim 1, wherein:
the sleeve peripheral surface (50) is defined by an imaginary outer sleeve cylinder ($C_{OS}$) having an outer sleeve diameter ($D_{OS}$);
the sleeve through hole wall surface (54) is defined by an imaginary inner sleeve cylinder ($C_{IS}$) having an inner sleeve diameter ($D_{IS}$); and
the inner sleeve diameter ($D_{IS}$) is greater than 70% of the outer sleeve diameter ($D_{OS}$).

12. The tool holder (22), according to claim 1, wherein:
at least one insert cartridge (26) comprises a plurality of cartridge pins (78), and
two of said plurality of cartridge pins (78) are located in a respective one of the sleeve adjustment grooves (62) defining two active cartridge pins (78a).

13. The tool holder (22), according to claim 1, wherein:
for each insert cartridge (26), the at least one cartridge pin (78) comprises a plurality of cartridge pins (78); and
for each insert cartridge (26), at least one of the cartridge pins (78) is not located in the at least one sleeve adjustment groove (62), thereby defining an at least one non-active cartridge pin (78b).

14. The tool holder (22), according to claim 13, wherein:
the forward body portion (32) comprises a plurality of cartridge pin storage channels (80) recessed in the body forward surface (36), each associated with one of the body engagement surfaces (42); and in the inner adjusted position:
for at least one insert cartridge (26), any non-active cartridge pin (78b) which is located radially inwards from the at least one active cartridge pin (78a) is located in one of the cartridge pin storage channels (80).

15. The tool holder (22), according to claim 13, wherein:
in each body engagement surface (42), the at least one engagement recess (74) is a linear engagement recess (74) and the at least one engagement projection (76) is a linear engagement projection (76); and
each cartridge pin storage channel (80) is arranged in a linear manner, parallel to the at least one linear engagement recess (74) and/or the at least one linear engagement projection (76) of the associated body engagement surface (42).

16. The tool holder (22), according to claim 13, wherein:
in the outer adjusted position:
for at least one insert cartridge (26), the at least one non-active cartridge pin (78b) is located radially outwards from the at least one active cartridge pin (78a).

17. The tool holder (22), according to claim 1, wherein:
in each body engagement surface (42), the at least one engagement recess (74) is a linear engagement recess (74) and the at least one engagement projection (76) is a linear engagement projection (76); and
each cartridge engagement surface (72) comprises at least one linear engagement recess (74) and/or at least one linear engagement projection (76); and
the at least one engagement projection (76) is engaged to the at least one engagement recess (74).

18. The tool holder (22), according to claim 17, wherein:
each body engagement surface (42) comprises a plurality of linear engagement recesses (74) and a plurality of linear engagement projections (76);
each cartridge engagement surface (72) comprises a plurality of linear engagement recesses (74) and a plurality of linear engagement projections (76);
the linear engagement recesses (74) alternate with the linear engagement projections (76); and
the plurality of linear engagement recesses (74) and the plurality of linear engagement projections (76) form a serrated engagement between the cartridge engagement surface (72) and the respective body engagement surface (42).

19. The tool holder (22), according to claim 17, wherein:
for each insert cartridge (26), the at least one cartridge pin (78) comprises a plurality of cartridge pins (78); and
for each insert cartridge (26), the plurality of cartridge pins (78) are arranged in a linear manner, parallel to the at least one linear engagement recess (74) and/or the at least one linear engagement projection (76) located at the cartridge engagement surface (72).

20. The tool holder (22), according to claim 17, wherein:
the at least one linear engagement projection (76) and/or the at least one linear engagement recess (74) provided at each body engagement surface (42) extends in the inward and outward adjustment directions ($D_I$, $D_O$), and
the inward and outward adjustment directions ($D_I$, $D_O$) are non-perpendicular to an axial pin half-plane (PP) containing the holder central axis (B) and intersecting the at least one active cartridge pin (78a).

21. The tool holder (22), according to claim 1, wherein in the inner and outer adjusted positions of the tool holder (22), the plurality of insert cartridges (26) are axially clamped to the holder body (24) by a clamping arrangement (82), the clamping arrangement including a clamping plate (84) comprising a plate through hole (92) and a plurality of plate clamping portions (93).

22. The tool holder (22), according to claim 21, wherein:
the forward body portion (32) comprises a body threaded hole (40) recessed in the body forward surface (36);
the clamping plate (84) is releasably attached to the tool holder (22) by a plate retaining screw (94) comprising a screw lower threaded portion (96), the plate retaining screw (94) located in the plate through hole (92) with the screw lower threaded portion (96) threadingly engaged with the body threaded hole (40); and
each plate clamping portion (93) clampingly engages a respective insert cartridge (26) to the holder body (24).

23. The tool holder (22), according to claim 22, wherein:
each insert cartridge (26) comprises:
a cartridge forward surface (64) opposite the cartridge rearward surface (66); and
an elongated cartridge pin recess (70) recessed in the cartridge forward surface (64);
the clamping plate (84) comprises:
opposite plate forward and rearward surfaces (86, 88) and a plate peripheral surface (90) extending therebetween; and
a plurality of plate pins (102) projecting from the rearward plate surface (88); and
for each insert cartridge (26), a respective plate pin (102) is located in the cartridge pin recess (70).

24. The tool holder (22), according to claim 22, wherein:
the plate through hole (92) comprises a plate through hole threaded portion (98);
the plate retaining screw (94) comprises a screw upper threaded portion (100), the screw lower threaded portion (96) being of opposite helical direction to the screw upper threaded portion (100); and
the screw upper threaded portion (100) is threadingly engaged with the plate through hole threaded portion (98).

25. A rotary cutting tool (20) comprising:
a tool holder (22) in accordance with claim 1; and
a plurality of cutting inserts (28), each cutting insert (28) releasably retained in a respective insert pocket (30).

26. The tool holder (22) according to claim 1, wherein:
in each body engagement surface (42), the at least one engagement recess (74) comprises a plurality of linear engagement recesses (74) and the at least one engagement projection (76) comprises a plurality of linear engagement projections (76), with the plurality of linear engagement recesses (74) alternating with the plurality of linear engagement projections (76);
within said each body engagement surface (42), said plurality of linear engagement recesses (74) and said plurality of linear engagement projections (76) have a common angular orientation; and
the common angular orientation of the linear engagement recesses (74) and the linear engagement projections (76) of said each body engagement surface (42) differs from the common angular orientation of the linear engagement recesses (74) and the linear engagement projections (76) belonging to all other body engagement surfaces.

27. The tool holder (22), according to claim 1, comprising exactly three insert cartridges (26) which are circumferentially spaced apart from one another by 120° about the holder central axis (B).

28. The tool holder (22), according to claim 1, wherein:
the plurality of insert cartridges (26) are not identical to one another;
for each insert cartridge (26), the at least one cartridge pin (78) comprises a plurality of cartridge pins (78); and
the cartridge pins (78) projecting from the cartridge rearward surface (66) of one of the plurality insert cartridges (26) project at locations different from the cartridge pins (78) belonging to other insert cartridges (26).

29. The tool holder (22), according to claim 28, wherein:
the adjustment sleeve (44) has exactly one sleeve adjustment groove (62); and
all insert cartridges (26) are located at the same radial distance from the holder central axis (B).

30. A tool holder (22) configured for rotation about a holder central axis (B) defining opposite axially forward and rearward directions ($D_F$, $D_R$), and opposite rotational preceding and succeeding directions ($D_P$, $D_S$) with the preceding direction ($D_P$) being a single cutting direction, the tool holder (22) comprising:
a holder body (24) comprising a forwardly disposed forward body portion (32), the forward body portion (32) comprising a generally forward facing body forward surface (36) and a body peripheral surface (38) which extends about the holder central axis (B) and bounds the body forward surface (36), the body forward surface (36) comprising a plurality of body engagement surfaces (42);
an adjustment sleeve (44) having a sleeve central axis (A), the adjustment sleeve (44) comprising:
opposite forward and rearward sleeve end surfaces (46, 48) and a sleeve peripheral surface (50) extending therebetween;
a sleeve through hole (52) comprising a sleeve through hole wall surface (54) which extends about the sleeve central axis (A) and connects the forward and rearward sleeve end surfaces (46, 48); and
at least one sleeve adjustment groove (62) recessed in the forward sleeve end surface (46), any and all of the sleeve adjustment grooves (62) spiraling inward in a rotational sleeve direction ($D_{RS}$) defined by one of the preceding and succeeding directions ($D_P$, $D_S$); and
a plurality of insert cartridges (26), each insert cartridge (26) comprising:
an insert pocket (30);
a rearward facing cartridge rearward surface (66) comprising a cartridge engagement surface (72) which is mutually engaged with a respective one of said plurality of body engagement surface (42) so that the insert cartridge (26) is displaceable in opposite inward and outward adjustment directions ($D_I$, $D_O$); and
at least one cartridge pin (78) projecting from the cartridge rearward surface (66),
wherein:
the adjustment sleeve (44) comprises a sleeve threaded through hole (56) opening out to the sleeve through hole wall surface (54) and the sleeve peripheral surface (50);
the forward body portion (32) comprises an annular body securing groove (58) recessed in the body peripheral surface (38) and extending about the holder central axis (B);
the adjustment sleeve (44) is releasably attached to the forward body portion (32) by a securing screw (60) located in the body securing groove (58) and threadingly engaged with the sleeve threaded through hole (56);
the adjustment sleeve (44) is circumferentially disposed about the holder body (24), with the sleeve through hole wall surface (54) facing the body peripheral surface (38) so that the adjustment sleeve (44) is rotationally displaceable with respect to the forward body portion (32);
at least one of the at least one cartridge pin (78) is located in a respective one of the sleeve adjustment grooves (62) defining at least one active cartridge pin (78a); and
the tool holder (22) is adjustable between an inner adjusted position and an outer adjusted position upon rotation of the adjustment sleeve (44) about the holder axis (B) in the rotational sleeve direction ($D_{RS}$); wherein
in the inner adjusted position:
each insert pocket (30) is spaced apart from the holder central axis (B) by a respective first radial pocket distance (R1); and
in the outer adjusted position:
each insert pocket (30) is spaced apart from the holder central axis (B) by a respective second radial pocket distance (R2), the second radial pocket distance (R2) being greater than the first radial pocket distance (R1).

31. A tool holder (22) configured for rotation about a holder central axis (B) defining opposite axially forward and rearward directions ($D_F$, $D_R$), and opposite rotational preceding and succeeding directions ($D_P$, $D_S$) with the preceding direction ($D_P$) being a single cutting direction, the tool holder (22) comprising:
a holder body (24) comprising:
a forwardly disposed forward body portion (32) having a generally forward facing body forward surface (36) comprising a plurality of circumferentially spaced apart body engagement surfaces (42) which define a plane perpendicular to said holder central axis (B), each body engagement surface comprising at least one engagement recess (74) and/or at least one engagement projection (76), with the body forward surface (36) being devoid of such engagement recesses (74) and/or engagement projections (76) in regions between the circumferentially spaced apart body engagement surfaces (42); and
a body peripheral surface (38) which extends about the holder central axis (B) and bounds the body forward surface (36);
an adjustment sleeve (44) having a sleeve central axis (A) and comprising:
opposite forward and rearward sleeve end surfaces (46, 48) and a sleeve peripheral surface (50) extending therebetween;
a sleeve through hole (52) comprising a sleeve through hole wall surface (54) which extends about the sleeve central axis (A) and connects the forward and rearward sleeve end surfaces (46, 48); and at least one sleeve adjustment groove (62), recessed in the forward sleeve end surface (46), and extending spirally inward for more than one turn of 360°; and a plurality of circumferentially spaced apart insert cartridges (26), each comprising:

an insert pocket (30);

opposite cartridge forward and rearward surfaces (64, 66), the cartridge rearward surface comprising a cartridge engagement surface (72) and at least one rearward projecting cartridge pin (78); and a cartridge peripheral surface (68) which extends between the cartridge forward and rearward surfaces (64, 66);

wherein:

the adjustment sleeve (44) is circumferentially disposed about the holder body (24), with the sleeve through hole wall surface (54) facing the body peripheral surface (38), the adjustment sleeve (44) being rotationally displaceable with respect to the forward body portion (32);

each insert cartridge (26) is engaged to a respective one of the body engagement surfaces (42) and is configured to be slidingly displaced in opposite inward and outward adjustment directions ($D_I$, $D_O$), upon rotation of the adjustment sleeve (44) in opposite rotational directions, relative to the forward body portion (32);

at least one of the at least one rearward projecting cartridge pin (78) of each insert cartridge (26) is located in the sleeve adjustment groove (62) defining at least one active cartridge pin (78*a*); and the tool holder (22) is adjustable between an inner adjusted position and an outer adjusted position; wherein in the inner adjusted position:

each insert pocket (30) is spaced apart from the holder central axis (B) by a respective first radial pocket distance (R1); and in the outer adjusted position:

each insert pocket (30) is spaced apart from the holder central axis (B) by a respective second radial pocket distance (R2), the second radial pocket distance (R2) being greater than the first radial pocket distance (R1).

32. The tool holder (22), according to claim 31, comprising exactly three insert cartridges (26) which are circumferentially spaced apart from one another by 120° about the holder central axis (B).

33. A tool holder (22) configured for rotation about a holder central axis (B) defining opposite axially forward and rearward directions ($D_F$, $D_R$), and opposite rotational preceding and succeeding directions ($D_P$, $D_S$) with the preceding direction ($D_P$) being a single cutting direction, the tool holder (22) comprising:

a holder body (24) comprising:

a forwardly disposed forward body portion (32) having a generally forward facing body forward surface (36) comprising a plurality of circumferentially spaced apart body engagement surfaces (42); and a body peripheral surface (38) which extends about the holder central axis (B) and bounds the body forward surface (36);

an adjustment sleeve (44) having a sleeve central axis (A) and comprising:

opposite forward and rearward sleeve end surfaces (46, 48) and a sleeve peripheral surface (50) extending therebetween;

a sleeve through hole (52) comprising a sleeve through hole wall surface (54) which extends about the sleeve central axis (A) and connects the forward and rearward sleeve end surfaces (46, 48); and at least one sleeve adjustment groove (62), recessed in the forward sleeve end surface (46), and extending spirally inward for more than one turn of 360°; and a plurality of circumferentially spaced apart insert cartridges (26), each comprising:

an insert pocket (30);

opposite cartridge forward and rearward surfaces (64, 66), the cartridge rearward surface comprising a cartridge engagement surface (72) and a plurality of rearward projecting cartridge pins (78); and a cartridge peripheral surface (68) which extends between the cartridge forward and rearward surfaces (64, 66);

wherein:

the plurality of insert cartridges (26) are not identical to one another;

the cartridge pins (78) projecting from the cartridge rearward surface (66) of one of the plurality insert cartridges (26) project at locations different from the cartridge pins (78) belonging to other insert cartridges (26);

the adjustment sleeve (44) is circumferentially disposed about the holder body (24), with the sleeve through hole wall surface (54) facing the body peripheral surface (38), the adjustment sleeve (44) being rotationally displaceable with respect to the forward body portion (32);

each insert cartridge (26) is engaged to a respective one of the body engagement surfaces (42) and is configured to be slidingly displaced in opposite inward and outward adjustment directions ($D_I$, $D_O$), upon rotation of the adjustment sleeve (44) in opposite rotational directions, relative to the forward body portion (32);

at least one of the plurality of rearward projecting cartridge pin (78) of each insert cartridge (26) is located in the sleeve adjustment groove (62) defining at least one active cartridge pin (78*a*); and the tool holder (22) is adjustable between an inner adjusted position and an outer adjusted position; wherein in the inner adjusted position:

each insert pocket (30) is spaced apart from the holder central axis (B) by a respective first radial pocket distance (R1); and in the outer adjusted position:

each insert pocket (30) is spaced apart from the holder central axis (B) by a respective second radial pocket distance (R2), the second radial pocket distance (R2) being greater than the first radial pocket distance (R1).

34. The tool holder (22), according to claim 33, wherein:

the adjustment sleeve (44) has exactly one sleeve adjustment groove (62); and all insert cartridges (26) are located at the same radial distance from the holder central axis (B).

35. A tool holder (22) configured for rotation about a holder central axis (B) defining opposite axially forward and rearward directions ($D_F$, $D_R$), and opposite rotational preceding and succeeding directions ($D_P$, $D_S$) with the preceding direction ($D_P$) being a single cutting direction, the tool holder (22) comprising:

a holder body (24) comprising a forwardly disposed forward body portion (32), the forward body portion (32) comprising a generally forward facing body forward surface (36) and a body peripheral surface (38) which extends about the holder central axis (B) and bounds the body forward surface (36), the body forward surface (36) being entirely perpendicular to the holder central axis (B) and comprising:
  a plurality of body engagement surfaces (42) which are circumferentially spaced apart from one another about the holder central axis (B), each body engagement surface comprising at least one engagement recess (74) and/or at least one engagement projection (76), with the body forward surface (36) being devoid of such engagement recesses (74) and/or engagement projections (76) in regions between the circumferentially spaced apart body engagement surfaces (42);
an adjustment sleeve (44) having a sleeve central axis (A), the adjustment sleeve (44) comprising:
  opposite forward and rearward sleeve end surfaces (46, 48) and a sleeve peripheral surface (50) extending therebetween;
  a sleeve through hole (52) comprising a sleeve through hole wall surface (54) which extends about the sleeve central axis (A) and connects the forward and rearward sleeve end surfaces (46, 48); and
  at least one sleeve adjustment groove (62) recessed in the forward sleeve end surface (46), any and all of the sleeve adjustment grooves (62) spiraling inward in a rotational sleeve direction ($D_{RS}$) defined by one of the preceding and succeeding directions ($D_P$, $D_S$); and
a plurality of insert cartridges (26), each insert cartridge (26) comprising:
  an insert pocket (30);
  a rearward facing cartridge rearward surface (66) comprising a cartridge engagement surface (72) which is mutually engaged with a respective one of said plurality of body engagement surfaces (42) so that the insert cartridge (26) is displaceable in opposite inward and outward adjustment directions ($D_I$, $D_O$); and
  at least one cartridge pin (78) projecting from the cartridge rearward surface (66),
wherein:
  the adjustment sleeve (44) is circumferentially disposed about the holder body (24), with the sleeve through hole wall surface (54) facing the body peripheral surface (38) so that the adjustment sleeve (44) is rotationally displaceable with respect to the forward body portion (32);
  at least one of the at least one cartridge pin (78) is located in a respective one of the sleeve adjustment grooves (62) defining at least one active cartridge pin (78a); and
  the tool holder (22) is adjustable between an inner adjusted position and an outer adjusted position upon rotation of the adjustment sleeve (44) about the holder axis (B) in the rotational sleeve direction ($D_{RS}$); wherein
    in the inner adjusted position:
      each insert pocket (30) is spaced apart from the holder central axis (B) by a respective first radial pocket distance (R1); and
    in the outer adjusted position:
      each insert pocket (30) is spaced apart from the holder central axis (B) by a respective second radial pocket distance (R2), the second radial pocket distance (R2) being greater than the first radial pocket distance (R1).

36. A tool holder (22) configured for rotation about a holder central axis (B) defining opposite axially forward and rearward directions ($D_F$, $D_R$), and opposite rotational preceding and succeeding directions ($D_P$, $D_S$) with the preceding direction ($D_P$) being a single cutting direction, the tool holder (22) comprising:
  a holder body (24) comprising a forwardly disposed forward body portion (32), the forward body portion (32) comprising a generally forward facing body forward surface (36) and a body peripheral surface (38) which extends about the holder central axis (B) and bounds the body forward surface (36) at an annular ridgeline, the body forward surface (36) comprising:
    a plurality of body engagement surfaces (42) which are circumferentially spaced apart from one another about the holder central axis (B), each body engagement surface comprising at least one engagement recess (74) and/or at least one engagement projection (76), with the body forward surface (36) being devoid of such engagement recesses (74) and/or engagement projections (76) in regions between the circumferentially spaced apart body engagement surfaces (42);
  an adjustment sleeve (44) having a sleeve central axis (A), the adjustment sleeve (44) comprising:
    opposite forward and rearward sleeve end surfaces (46, 48) and a sleeve peripheral surface (50) extending therebetween;
    a sleeve through hole (52) comprising a sleeve through hole wall surface (54) which extends about the sleeve central axis (A) and connects the forward and rearward sleeve end surfaces (46, 48); and
    at least one sleeve adjustment groove (62) recessed in the forward sleeve end surface (46), any and all of the sleeve adjustment grooves (62) spiraling inward in a rotational sleeve direction ($D_{RS}$) defined by one of the preceding and succeeding directions ($D_P$, $D_S$); and
  a plurality of insert cartridges (26), each insert cartridge (26) comprising:
    an insert pocket (30);
    a rearward facing cartridge rearward surface (66) comprising a cartridge engagement surface (72) which is mutually engaged with a respective one of said plurality of body engagement surfaces (42) so that the insert cartridge (26) is displaceable in opposite inward and outward adjustment directions ($D_I$, $D_O$); and
    at least one cartridge pin (78) projecting from the cartridge rearward surface (66),
  wherein:
    the adjustment sleeve (44) is circumferentially disposed about the holder body (24), with the sleeve through hole wall surface (54) facing the body peripheral surface (38) so that the adjustment sleeve (44) is rotationally displaceable with respect to the forward body portion (32);
    at least one of the at least one cartridge pin (78) is located in a respective one of the sleeve adjustment grooves (62) defining at least one active cartridge pin (78a); and
    the tool holder (22) is adjustable between an inner adjusted position and an outer adjusted position upon rotation of the adjustment sleeve (44) about the holder axis (B) in the rotational sleeve direction ($D_{RS}$); wherein in the inner adjusted position:
   each insert pocket (30) is spaced apart from the holder central axis (B) by a respective first radial pocket distance (R1); and in the outer adjusted position:
   each insert pocket (30) is spaced apart from the holder central axis (B) by a respective second radial pocket distance (R2), the second radial pocket distance (R2) being greater than the first radial pocket distance (R1).

\* \* \* \* \*